(12) United States Patent
Sarkis et al.

(10) Patent No.: US 12,262,366 B2
(45) Date of Patent: *Mar. 25, 2025

(54) USER EQUIPMENT COORDINATION FOR SIDELINK

(71) Applicant: QUALCOMM Incorporated, San Diego, CA (US)

(72) Inventors: Gabi Sarkis, San Diego, CA (US); Tien Viet Nguyen, Bridgewater, NJ (US); Sourjya Dutta, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,682

(22) Filed: Oct. 16, 2023

(65) Prior Publication Data

US 2024/0040559 A1   Feb. 1, 2024

Related U.S. Application Data

(63) Continuation of application No. 18/052,127, filed on Nov. 2, 2022, now Pat. No. 11,825,464, which is a
(Continued)

(51) Int. Cl.
*H04W 72/12* (2023.01)
*H04L 5/00* (2006.01)

(52) U.S. Cl.
CPC ........... *H04W 72/12* (2013.01); *H04L 5/0055* (2013.01)

(58) Field of Classification Search
CPC .................................................. H04W 48/12
(Continued)

(56) References Cited

U.S. PATENT DOCUMENTS 11,503,617 B1   11/2022   Sarkis
2020/0396621 A1   12/2020   Park et al.
(Continued)

OTHER PUBLICATIONS

CATT: "Physical Layer Structure for NR Sidelink", 3GPP TSG RAN WG1 Meeting #99, R1-1912153, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 22 Pages, XP051823234, Section 4.3, Section 8, Proposal 32, Section 4.1 2-stage SCI contents, Section 5.1.
(Continued)

*Primary Examiner* — Angel T Brockman
(74) *Attorney, Agent, or Firm* — Holland & Hart LLP

(57) ABSTRACT

Methods, systems, and devices for wireless communications are described. A user equipment (UE) may receive, from another UE, a coordination message that includes resource information (e.g., a preference status) for communication resources. The UE receiving the coordination message may determine a status of one or more resources based on the resource information, an intended recipient of the coordination message (e.g., based on a destination identifier of the coordination message), or a communication connection associated with the one or more resources. The status may indicate that a respective resource of the one or more resources is available, reserved, preferred, or non-preferred, or some combination thereof. In some examples, the one or more resources may be for a sidelink connection or a unicast connection. The receiving UE may utilize the determined status to select one or more resources for a sidelink transmission.

20 Claims, 12 Drawing Sheets

Related U.S. Application Data continuation of application No. 17/313,897, filed on May 6, 2021, now Pat. No. 11,503,617.

(58) Field of Classification Search
USPC .......................................................... 370/329
See application file for complete search history.

(56) References Cited

U.S. PATENT DOCUMENTS

| | | | |
|---|---|---|---|
| 2022/0361185 A1 | 11/2022 | Sarkis et al. | |
| 2023/0119779 A1* | 4/2023 | Sarkis .................. | H04W 72/20 370/329 |

OTHER PUBLICATIONS

CEWIT: "Feasibility and Benefits for NR Sidelink Mode 2 Enhancements", 3GPP Draft, 3GPP TSG RAN WG1 104-e, R1-2101647, 3rd Generation Partnership Project (3GPP), Mobile Competence Centre, 650, Route Des Lucioles, F-06921 Sophia-Antipolis Cedex, France, vol. RAN WG1, No. e-meeting, Jan. 25, 2021-Feb. 5, 2021, Jan. 18, 2021 (Jan. 18, 2021), XP051971802, 5 Pages.

Intel Corporation: "Further Considerations on Sidelink Unicast/Groupcast/Broadcast for NR V2X Communication", 3GPP Draft, R1-1812492, 3GPP TSG RAN WG1 Meeting #95, Intel -EV2X_SL_UGB, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051554436, pp. 1-7.

International Search Report and Written Opinion—PCT/US2022/022899—ISA/EPO—Jun. 23, 2022.

Lenovo et al., "Sidelink Resource Allocation for Reliability Enhancement", 3GPP TSG RAN WG1 Meeting #104e, R1-2100767, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970513, 6 Pages, p. 2, last paragraph, paragraph [0001]-paragraph [0002].

* cited by examiner

USER EQUIPMENT COORDINATION FOR SIDELINK

CROSS REFERENCE

The present application for patent is a Continuation of U.S. patent application Ser. No. 18/052,127 by SARKIS et al., entitled "USER EQUIPMENT COORDINATION FOR SIDELINK" filed Nov. 2, 2022, which is a Continuation of U.S. patent application Ser. No. 17/313,897 by SARKIS et al., entitled "USER EQUIPMENT COORDINATION FOR SIDELINK" filed May 6, 2021, assigned to the assignee hereof, and each of which are expressly incorporated by reference in its entirety herein.

FIELD OF TECHNOLOGY

The following relates to wireless communications, including user equipment (UE) coordination for sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support sidelink communications between wireless devices. For example, a UE may communicate with other UEs via one or more sidelink connections. In some examples, the UE may determine resources to use for sidelink communications with the other UEs based on whether the resources are occupied (e.g., reserved by other sidelink UEs) or available.

SUMMARY

The described techniques relate to improved methods, systems, devices, and apparatuses that support user equipment (UE) coordination for sidelink. Generally, the described techniques provide for a UE to receive, from another UE, a coordination message that includes coordination information for resources to be used in sidelink communications and determine or otherwise identify a status of one or more of the resources, the status indicating whether a respective resource is preferred, non-preferred, available, or reserved. For example, the coordination information may indicate a preference status for each of the one or more resources, such as an indication that a resource is preferred or non-preferred, and the UE may identify the status based on the indicated preference status. Additionally, or alternatively, the UE may determine the status based on whether the UE is the intended recipient of the coordination message; if the UE is not the intended recipient, the UE may determine that the status of the one or more resources is non-preferred, while if the UE is the intended recipient, the UE may determine that the status of the one or more resources is preferred (or vice versa). The UE may utilize the determined status(es) to select one or more resources for a sidelink transmission.

In some examples, the UE may identify a status based on a unicast connection associated with the one or more resources (e.g., for sidelink communications). For example, the UE may determine (e.g., based on a received coordination message) that one or more resources are preferred for a first unicast connection. The UE may determine that the one or more resources are preferred or non-preferred for a second unicast connection based on the one or more resources being preferred for the first unicast connection. In some cases, the coordination message may indicate or include a destination identifier, a source identifier, a unicast connection associated with the one or more resources, or some combination thereof.

A method for wireless communications at a first UE is described. The method may include receiving, from a second UE, a coordination message over a sidelink channel that indicates a preference status of communication resources for sidelink communications between two or more UEs, identifying a status of one or more communication resources for the sidelink communications based on the received coordination message, where the identified status of each communication resource of the one or more communication resources indicates whether a respective communication resource is available, reserved, preferred, or non-preferred, or a combination thereof, and selecting a communication resource for the sidelink communications based on the identified status of the one or more communication resources.

An apparatus for wireless communications at a first UE is described. The apparatus may include a processor, memory coupled with the processor, and instructions stored in the memory. The instructions may be executable by the processor to cause the apparatus to receive, from a second UE, a coordination message over a sidelink channel that indicates a preference status of communication resources for sidelink communications between two or more UEs, identify a status of one or more communication resources for the sidelink communications based on the received coordination message, where the identified status of each communication resource of the one or more communication resources indicates whether a respective communication resource is available, reserved, preferred, or non-preferred, or a combination thereof, and select a communication resource for the sidelink communications based on the identified status of the one or more communication resources.

Another apparatus for wireless communications at a first UE is described. The apparatus may include means for receiving, from a second UE, a coordination message over a sidelink channel that indicates a preference status of communication resources for sidelink communications between two or more UEs, means for identifying a status of one or more communication resources for the sidelink communications based on the received coordination message, where the identified status of each communication resource of the one or more communication resources indicates whether a respective communication resource is available, reserved, preferred, or non-preferred, or a combination thereof, and means for selecting a communication resource for the sidelink communications based on the identified status of the one or more communication resources.

A non-transitory computer-readable medium storing code for wireless communications at a first UE is described. The code may include instructions executable by a processor to receive, from a second UE, a coordination message over a sidelink channel that indicates a preference status of communication resources for sidelink communications between two or more UEs, identify a status of one or more communication resources for the sidelink communications based on the received coordination message, where the identified status of each communication resource of the one or more communication resources indicates whether a respective communication resource is available, reserved, preferred, or non-preferred, or a combination thereof, and select a communication resource for the sidelink communications based on the identified status of the one or more communication resources.

In some examples of the method, apparatuses, and non-transitory computer-readable medium described herein, identifying the status may include operations, features, means, or instructions for identifying that the one or more communication resources may be preferred for the sidelink communications between the two or more UEs or the one or more communication resources may be non-preferred for the sidelink communications between the two or more UEs, where the preference status indicates whether the one or more communication resources may be preferred or non-preferred for the sidelink communications between the two or more UEs.

Some examples of the method, apparatuses, and non-transitory computer-readable medium described herein may further include operations, features, means, or instructions for transmitting a message requesting the coordination message for the sidelink communications, where receiving the coordination message may be based on transmitting the message.

Some examples of the method, apparatuses, and non-transitory computer-readable medium described herein may further include operations, features, means, or instructions for identifying whether the first UE may be an intended recipient of the coordination message, where identifying the status of the one or more communication resources may be based on identifying whether the first UE may be the intended recipient of the coordination message.

Some examples of the method, apparatuses, and non-transitory computer-readable medium described herein may further include operations, features, means, or instructions for identifying whether the coordination message indicates preferred resources or non-preferred resources, where identifying the status of the one or more communication resources may be based on identifying whether the first UE may be the intended recipient of the coordination message and identifying whether the coordination message indicates the preferred resources or the non-preferred resources.

In some examples of the method, apparatuses, and non-transitory computer-readable medium described herein, identifying the status may include operations, features, means, or instructions for identifying that the communication resource may be a preferred resource based on the first UE being the intended recipient and the coordination message indicating the preferred resources.

In some examples of the method, apparatuses, and non-transitory computer-readable medium described herein, identifying the status may include operations, features, means, or instructions for identifying that the communication resource may be a non-preferred resource based on a third UE being the intended recipient and the coordination message indicating the preferred resources.

In some examples of the method, apparatuses, and non-transitory computer-readable medium described herein, identifying the status may include operations, features, means, or instructions for identifying that the communication resource may be a non-preferred resource based on the first UE being the intended recipient and the coordination message indicating the non-preferred resources.

In some examples of the method, apparatuses, and non-transitory computer-readable medium described herein, the coordination message includes or may be associated with an indication of the intended recipient.

Some examples of the method, apparatuses, and non-transitory computer-readable medium described herein may further include operations, features, means, or instructions for identifying a destination identifier included in or associated with the coordination message, where identifying whether the first UE may be the intended recipient of the coordination message may be based on identifying the destination identifier.

In some examples of the method, apparatuses, and non-transitory computer-readable medium described herein, the destination identifier may be included in sidelink control information (SCI) associated with the coordination message.

In some examples of the method, apparatuses, and non-transitory computer-readable medium described herein, identifying whether the first UE may be the intended recipient of the coordination message may be based on the coordination message being associated with a process to reserve the communication resource for the sidelink communications.

In some examples of the method, apparatuses, and non-transitory computer-readable medium described herein, the coordination message includes a portion of a radio resource control (RRC) message, a portion of a medium access control control element (MAC-CE), a portion of a first-stage SCI, or a portion of a second-stage SCI.

In some examples of the method, apparatuses, and non-transitory computer-readable medium described herein, the one or more communication resources for the sidelink communications may be associated with a first unicast communication connection between the first UE and the second UE and identifying the status further includes identifying that the one or more communication resources may be preferred resources of the first unicast communication connection based on receiving the coordination message.

Some examples of the method, apparatuses, and non-transitory computer-readable medium described herein may further include operations, features, means, or instructions for identifying that a second communication resource of a second unicast communication connection between the first UE and the second UE may be a preferred resource based on receiving the coordination message for the first unicast communication connection, the second communication resource corresponding to one of the one or more communication resources of the first unicast communication connection.

Some examples of the method, apparatuses, and non-transitory computer-readable medium described herein may further include operations, features, means, or instructions for identifying that a second communication resource of a second unicast communication connection between the first UE and the second UE may be a non-preferred resource based on receiving the coordination message for the first unicast communication connection that indicates that the one or more communication resources may be the preferred resources, the second communication resource corresponding to one of the one or more communication resources of the first unicast communication connection.

Some examples of the method, apparatuses, and non-transitory computer-readable medium described herein may further include operations, features, means, or instructions for identifying that a second communication resource of a second unicast communication connection between the first UE and a third UE may be a non-preferred resource based on receiving the coordination message for the first unicast communication connection that indicates that the one or more communication resources may be the preferred resources, the second communication resource corresponding to one of the one or more communication resources of the first unicast communication connection.

In some examples of the method, apparatuses, and non-transitory computer-readable medium described herein, the coordination message indicates a source identifier and a destination identifier and the method, apparatuses, and non-transitory computer-readable medium may include further operations, features, means, or instructions for identifying the first unicast communication connection based on the source identifier and the destination identifier.

In some examples of the method, apparatuses, and non-transitory computer-readable medium described herein, the coordination message includes a first indication of the first unicast communication connection and a second indication of a second unicast communication connection.

In some examples of the method, apparatuses, and non-transitory computer-readable medium described herein, the coordination message indicates whether a resource conflict for the one or more communication resources for the sidelink communications may be detected.

In some examples of the method, apparatuses, and non-transitory computer-readable medium described herein, an indication of the resource conflict includes a negative acknowledgement (NACK) associated with a message transmitted by a scheduling UE of the sidelink communications.

Some examples of the method, apparatuses, and non-transitory computer-readable medium described herein may further include operations, features, means, or instructions for identifying that the communication resource may be a preferred resource based on the first UE being the intended recipient and the coordination message indicating the preferred resources.

Some examples of the method, apparatuses, and non-transitory computer-readable medium described herein may further include operations, features, means, or instructions for identifying that the communication resource may be a non-preferred resource based on a third UE being the intended recipient and the coordination message indicating the preferred resources.

DETAILED DESCRIPTION

Figure 1:
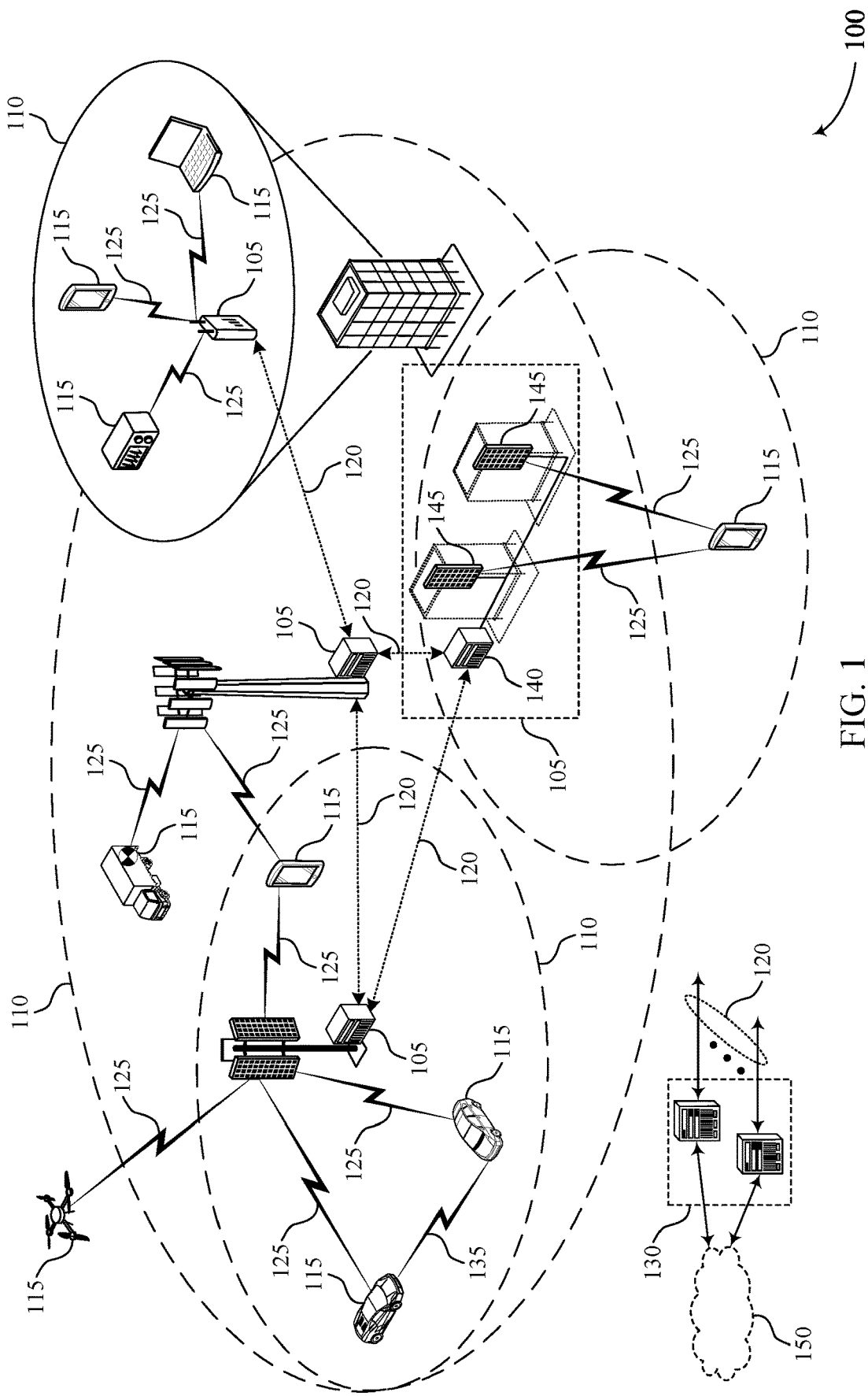
FIGS. 1 and 2 illustrate examples of wireless communications systems that support user equipment (UE) coordination for sidelink in accordance with aspects of the present disclosure.

Some wireless communications systems may support sidelink communications, where user equipment (UEs) may communicate with one another over a sidelink channel. UEs communicating via sidelink may not be scheduled by a central entity (e.g., a base station), and as such, may autonomously select resources (e.g., time resources, frequency resources) to use for transmissions by determining whether each resource (e.g., of a pool of resources) is available or occupied (e.g., reserved by another sidelink UE). For example, a UE may perform a sensing procedure during a sensing window to sense a pool of resources and determine which, if any, are available. The UE may select resources from the available resources, for instance, during a resource selection window, and may use the selected resources to perform sidelink transmissions.

In some examples, a UE may generate and share coordination information with one or more other UEs via a coordination message transmitted over a sidelink connection, e.g., to assist in resource selection. Coordination information may include information (e.g., a preference status) about one or more resources of the pool of resources. For example, a first UE may transmit, to a second UE (e.g., and one or more additional UEs), a coordination message that includes an indication that one or more resources are preferred for transmissions of the second UE. Additionally, or alternatively, the coordination message may include an indication that one or more resources are not preferred for transmissions of the second UE, or may indicate a resource conflict. The second UE may use the coordination information (e.g., in combination with a sensing procedure) to select resources (e.g., during a resource selection window). For instance, the second UE may select resources that were indicated as preferred by the coordination message.

In some cases, however, the quantity of other UEs to which the first UE may transmit coordination messages may be relatively large. If the coordination messages are UE-specific (e.g., generated for and transmitted to each receiving UE separately), transmitting a coordination message to every UE may consume a considerable amount of time and/or network resources. Additionally, UEs communicating via sidelink may operate using half-duplex communications; thus, a UE that is transmitting over a sidelink channel may be unable to receive information (such as a coordination message) over another sidelink channel, e.g., for the duration of the transmission.

To avoid missing such reception opportunities and to increase efficiency in resource allocation for sidelink communications, a receiving UE may interpret coordination information of a received coordination message based on whether the receiving UE is an intended recipient of the coordination message. That is, the coordination message may include an indication of the intended recipient, such as a destination identifier, or an indication of a communication connection associated with the resources, that the receiving UE may use to identify a status of the resources. For example, if the receiving UE is the intended recipient (e.g., as indicated by the destination identifier), the receiving UE may identify that the status of the or more indicated resources is preferred. If the receiving UE is not the intended recipient, the receiving UE may identify that the status of the one or more indicated resources is non-preferred, e.g., as the resources are intended to be indicated as preferred for another UE associated with the destination identifier.

Additionally, or alternatively, the receiving UE may interpret the coordination message based on a communication connection associated with the resources. For example, the receiving UE may have one or more unicast connections with one or more other UEs. The coordination message may include an indication that the coordination information is associated with a first unicast connection and that one or more resources are preferred for the first unicast connection. The receiving UE may determine that the one or more resources are preferred for the first unicast connection and are non-preferred for a second unicast connection. In some examples, if the coordination message indicates that the first and second unicast connections are with a same UE, the receiving UE may instead determine that the one or more resources are preferred for both the first and second unicast connections.

Aspects of the disclosure are initially described in the context of wireless communications systems. Aspects of the disclosure are then described with reference to a resource selection procedure and a process flow. Aspects of the disclosure are further illustrated by and described with reference to apparatus diagrams, system diagrams, and flowcharts that relate to UE coordination for sidelink.

FIG. 1 illustrates an example of a wireless communications system 100 that supports UE coordination for sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, two UEs 115 may communicate with each other via a communication link 135 (e.g., a sidelink connection or a sidelink communication link). In such cases, for example, a first UE 115 may receive one or more sidelink transmissions from a second UE 115 over a sidelink channel, which may include one or both of a sidelink control channel or a sidelink data channel. For example, the first UE 115 may receive a first stage of SCI (which may be referred to herein as SCI-1) over a sidelink control channel, such as a physical sidelink control channel (PSCCH), and a second stage of SCI (which may be referred to herein as SCI-2) and data over a sidelink data channel, such as a physical sidelink shared channel (PSSCH).

To receive a sidelink transmission (e.g., an SCI-1, an SCI-2, etc.), the first UE 115 may perform blind decoding over sidelink subchannels. The first UE 115 may receive and decode an SCI-1 in the PSCCH, where the SCI-1 includes PSSCH bandwidth information and resource reservations for future slots. After decoding the PSCCH, the first UE 115 may receive an SCI-2. The SCI-2 may include a source identifier indicating the transmitting device (e.g., the second UE 115, a base station 105) and/or a destination identifier indicating the intended receiving device (e.g., the first UE 115, the second UE 115, a different UE 115, etc.). The first UE 115 may use the destination identifier to determine whether the SCI-2 is for the first UE 115.

In some scenarios, the first UE 115 and the second UE 115 may determine or otherwise identify a resource allocation for communications between the first UE 115 and the second UE 115 (which may be carried over a PC5 link) according to various modes. In a first mode (e.g., mode 1), for example, a serving base station 105 may assign the transmission resources for sidelink communications between the first UE 115 and the second UE 115 through downlink control information (DCI), such as DCI 3_0.

In a second mode, the second UE 115 (e.g., the transmitting UE 115), may autonomously (e.g., without signaling from the base station 105) select resources for sidelink communications between the first UE 115 and the second UE 115. Further, in the second mode, the second UE 115 may perform channel sensing based on blind decoding PSCCH channels (e.g., all PSCCH channels) to determine or otherwise identify which resources of the PSCCH are reserved by other UEs 115 for other sidelink transmissions. That is, the second UE 115 may determine or otherwise identify which resources of a resource pool are available to use for transmissions to the first UE 115 (e.g., or other UEs 115 via sidelink channels). The second UE 115 may select one or more resources from the available resources of the resource pool, for example, during a resource selection window, and may transmit a message using the selected one or more resources.

According to the techniques described herein, the first UE 115 and the second UE 115 may utilize coordination information of a coordination message to more efficiently and reliably select resources for sidelink communications. For instance, the first UE 115 may transmit, to the second UE 115, a coordination message. In some examples, the second UE 115 may transmit, to the first UE 115, a message including a request for the coordination message. The coordination message may be included as part of an RRC message, a MAC-CE, SCI-1, or SCI-2. The coordination message may include coordination information that indicates a preference status of resources for sidelink communications between two or more UEs 115 (which may or may not include the first UE 115 and/or the second UE 115), such as whether a given resource is preferred or non-preferred. The second UE 115 may identify a status of one or more resources based on the coordination information (e.g., the preference status information) included in the coordination message, and, in some cases, based on channel sensing. For instance, the second UE 115 may identify that a respective resource is available, reserved, preferred, non-preferred, or a combination thereof. The second UE 115 may select resources for sidelink communications based on the identified status.

As an example, the coordination message may indicate that a first resource is preferred for the second UE 115. The second UE 115 may determine that the first resource has a status of preferred and a status of available, for instance, based on the indication in the coordination message and a channel sensing procedure performed by the second UE 115. The coordination message may indicate that a second resource is non-preferred for the second UE 115. During a resource selection window, the second UE 115 may select at least the first resource and may refrain from selecting at least the second resource. The second UE 115 may transmit a sidelink message using at least the first resource.

In some examples, the second UE 115 may determine or otherwise identify a status of one or more of the resources based on the intended recipient of the coordination message, which may, in some cases, be indicated by the coordination message or by SCI-2 associated with the coordination message. For example, the coordination message may include an indication of the intended recipient, such as a destination identifier; as another example, the coordination message may be associated with or may include an SCI-2, and the SCI-2 may include the indication of the intended recipient (e.g., as a destination identifier). If the second UE 115 determines that the second UE 115 is the intended recipient of the coordination message, the second UE 115 may identify that the one or more resources indicated in the coordination message are preferred for the second UE 115. Alternatively, if the second UE 115 is not the intended recipient, the second UE 115 may identify that the one or more resources indicated in the coordination message are preferred for a different UE 115 (i.e., the intended recipient) and thus are non-preferred for the second UE 115.

The second UE 115 may additionally or alternatively identify whether the second UE 115 is an intended recipient based on an implicit association between the coordination message and one or more of the resources. For instance, the second UE 115 may transmit a request for the coordination message on a first resource and may receive the coordination message on a second resource; the second UE 115 may identify that the coordination message is intended for the second UE 115 based on the coordination message being received on the second resource. As another example, the second UE 115 may determine that the second UE 115 is an intended recipient by identifying that the coordination message is associated with a process to reserve the one or more resources. Additionally, or alternatively, the coordination message may be received on a resource that is associated with a resource indicated in the coordination message; the second UE 115 may identify the resource indicated in the coordination message based on identifying the association.

In some cases, the second UE 115 may have multiple unicast connections with other UEs 115 including the first UE 115. The second UE 115 may identify a status of the one or more resources for each unicast connection based on the coordination message. For example, if a coordination message indicates that the one or more resources are preferred for a first unicast connection with the first UE 115, the second UE 115 may determine that the one or more resources are non-preferred for a second unicast connection with a third UE 115. In some examples, the coordination message may include or may be associated with an indication (e.g., a source identifier and a destination identifier) that both the first and second unicast connections are with a same UE 115, such as the first UE 115. In such examples, the second UE 115 may determine that the one or more resources indicated as preferred for the first unicast connection are also preferred for the second unicast connection. Alternatively, the second UE 115 may determine that the one or more resources indicated as preferred for the first unicast connection are non-preferred for the second unicast connection.

Figure 2:
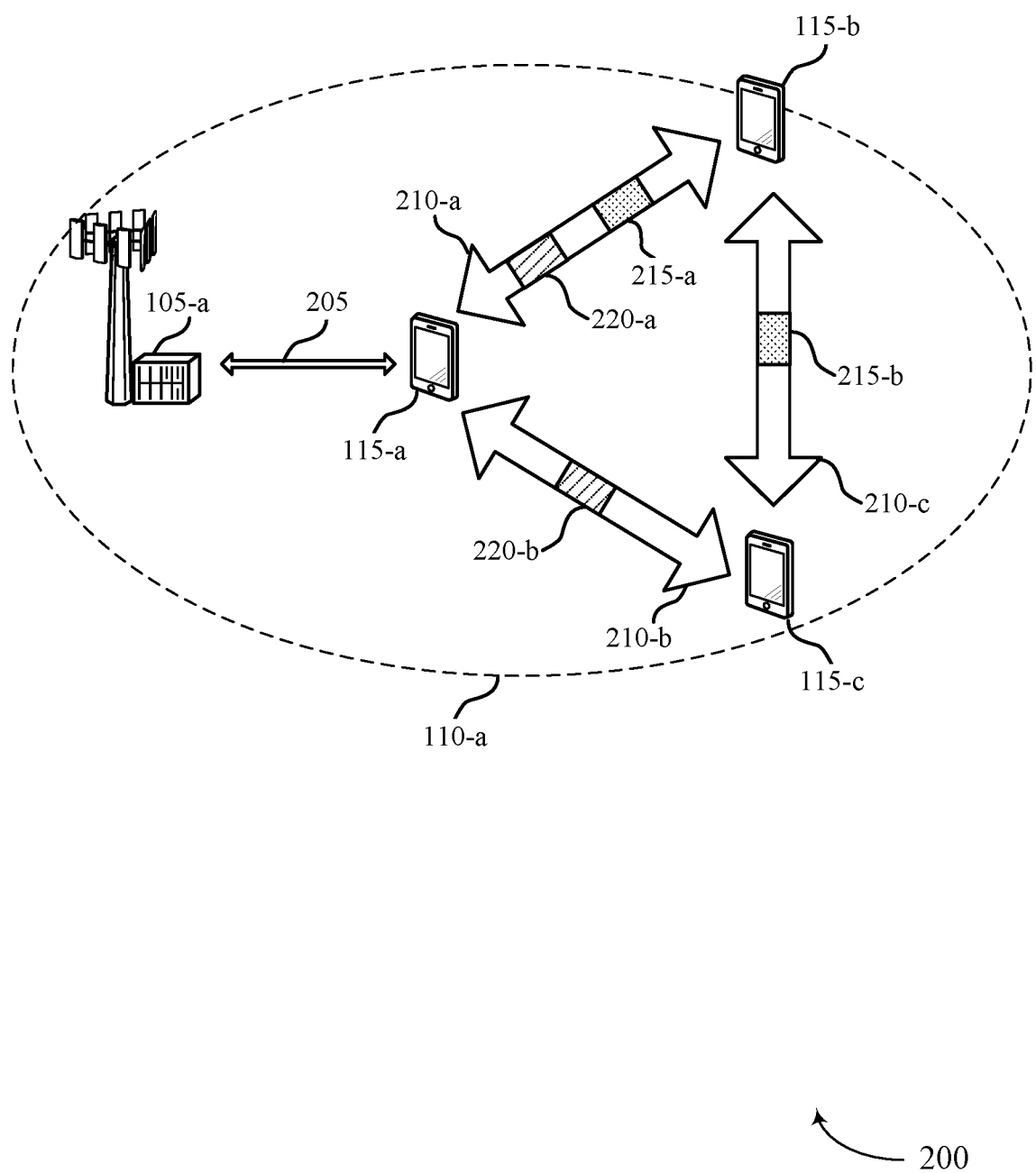

FIG. 2 illustrates an example of a wireless communications system 200 that supports UE coordination for sidelink in accordance with aspects of the present disclosure. The wireless communications system 200 may implement aspects of the wireless communications system 100. For example, the wireless communications system 200 may include a coverage area 110-a and UEs 115 and a base station 105, which may be examples of the corresponding devices described herein. The UE 115-a may communicate with the base station 105-a via a communication link 205. The UEs 115 may communicate with one another via sidelinks 210 (e.g., sidelink communication links, which may also be referred to as sidelink connections). For instance, the UEs 115 may transmit and receive sidelink messages 215.

The UEs 115 in FIG. 2 may operate in a first mode (e.g., mode 1) or a second mode (e.g., mode 2) for sidelink communications. In the first mode, for example, the UE 115-a may receive an indication of a resource allocation from the base station 105-a via communication link 205. Here, the base station 105-a may assign transmission resources for sidelink communications between the UE 115-a and the UEs 115-b and 115-c through DCI. For example, the base station 105-a may transmit, to the UE 115-a, a DCI indicating an allocation of time and frequency resources and a transmission timing. The UE 115-a may transmit a sidelink transmission 215-a to the UE 115-b via the sidelink 210-a using the allocated resources.

In the example of FIG. 2, the UEs 115-a, 115-b, and 115-c may operate in the second mode. Thus, the UEs 115-a, 115-b, and 115-c may not receive sidelink resource allocation information from the base station 105-a and may autonomously select resources from a resource pool for communicating with one another via sidelinks 210. For example, the UE 115-a may perform channel sensing based on blind decoding PSCCH channels (e.g., all PSCCH channels) to determine or otherwise identify which resources of the resource pool are reserved by other sidelink transmissions. The pool of resources may include a number of subchannels over a number of slots and may be shared among the UEs 115, and the UE 115-a may perform a sensing procedure, during a sensing window, over the pool of resources to determine occupied (e.g., unavailable) or candidate (e.g., available) resources to use for sidelink transmissions. For example, some resources may be reserved for use by the other UEs 115, or some subchannels may experience relatively high levels of interference such that, even if the UE 115-a transmits a message over those subchannels, a receiving UE 115 would have a relatively low likelihood of successfully receiving and decoding the message.

During a sensing window, a UE 115 (e.g., the UE 115-a, in addition to the UEs 115-b and 115-c) may perform channel sensing (e.g., sidelink channel sensing) by decoding SCI to identify the occupied or available sidelink resources. In the example of FIG. 2, each SCI received by a UE 115 may be broadcast by a respective UE 115 (e.g., UE 115-a may broadcast an SCI, UE 115-b may broadcast an SCI, UE 115-c may broadcast an SCI, and so forth) and may indicate sidelink resources reserved by the respective UE 115. The sensing may be performed, for example, by decoding scheduling information included in the SCI(s). The UE 115 may receive the SCI during a sensing window and may use the information included in the SCI to identify or otherwise determine available resources, e.g., resources that are not indicated as being reserved in the SCI(s).

Additionally, a UE 115 (e.g., the UE 115-a, in addition to the UEs 115-b and 115-c) may receive, from another UE 115, a coordination message 220 that includes coordination information for one or more resources of the pool of resources. In some examples, the coordination message 220 may be transmitted as part of SCI, e.g., as part of SCI-1 or SCI-2, while in other examples, the coordination message 220 may be transmitted as part of an RRC message or a MAC-CE. The coordination message 220 may indicate (e.g., as part of coordination information) a preference status for each resource of the one or more resources, where the preference status indicates that a respective resource is preferred or non-preferred (e.g., for sidelink communications between two or more UEs 115). The UE 115 may identify a status of the one or more resources based on the preference status and, in some examples, the results of the sensing procedure. For instance, the UE 115 may identify that a first resource has a status of preferred based on the received coordination message 220 and a status of available based on the sensing procedure. The UE 115 may likewise identify that a second resource has a status of non-preferred based on the received coordination message 220 and a status of reserved based on the sensing procedure.

In some examples, the coordination message 220 may include a bitmap to indicate the preference statuses for the one or more resources, where each bit corresponds to a resource and the value of the bit indicates the preference status (e.g., a value of 1 may correspond to a preference status of preferred while a value of 0 corresponds to a preference status of non-preferred, or vice-versa, among other examples). In other examples, the preference status may be indicated via one or more lists, such as a list of time and frequency locations of preferred resources and a list of time and frequency locations of non-preferred resources.

Additionally, in some cases, the coordination message 220 may indicate that a resource may be associated with conflicting transmissions (e.g., the same resource may be reserved by two different UEs 115) or with a conflict that has already occurred. For example, the coordination message 220 may indicate (e.g., using one or more bits) that a resource conflict is detected for one or more resources, where the resource conflict may be between two or more UEs 115. The indication may include a NACK associated with a message transmitted by a scheduling UE, such as the UE 115-a. In some cases, a UE 115 receiving the coordination message 220 may change a resource reservation based on the indicated conflict.

A resource conflict may occur if, for example, two (or more) UEs 115 reserve a same resource. UEs 115 communicating via sidelink may operate in a half-duplex mode, where a UE 115 may only communicate in one direction at a given time. For example, in a time slot, a UE 115 may transmit a message or receive a message, but may not transmit and receive simultaneously. Accordingly, if a UE 115, such as the UE 115-a, reserves a resource (e.g., transmits an indication of a resource reservation, for instance, as part of SCI) at the same time that another UE 115, such as the UE 115-b, reserves the same resource, the UE 115-a may not be able to receive the resource reservation from the UE 115-b and may be unaware that the UE 115-b has also reserved the resource. Likewise, the UE 115-*b* may not receive the resource reservation from the UE 115-*a* and may be unaware of the conflict. Including a conflict indication in a coordination message 220 may enable the UE 115-*a* and/or the UE 115-*b* to resolve the resource conflict, for example, by removing or changing one or both reservations, selecting a different resource, or, if the conflict has already occurred, retransmitting a message associated with the conflicting resource.

In addition to a preference status or a conflict indication, the coordination message 220 may include or may be associated with an indication of an intended recipient of the coordination message 220. For example, the coordination message 220 may be associated with (e.g., transmitted as part of) SCI-2 and the SCI-2 may include a destination identifier. Additionally, or alternatively, the coordination message 220 may include an explicit indication of an intended recipient of the coordination message 220. In some examples, the coordination message 220 may include explicit indications of the intended recipient for each respective portion of the coordination message 220; as an example, the coordination message 220 may indicate that a first portion is intended for the UE 115-*a* and a second portion is intended for the UE 115-*b*, or that a first portion of preference statuses (e.g., corresponding to a first set of resources) are intended for the UE 115-*a* and a second portion of preference statuses (e.g., corresponding to a second set of resources) are intended for the UE 115-*b*, and so forth.

A UE 115, such as the UE 115-*a*, may transmit a dedicated coordination message 220 directly to an intended recipient (i.e., another UE 115, such as the UE 115-*b* or the UE 115-*c*), or may transmit a same coordination message 220 to multiple UEs 115 (e.g., both the UE 115-*b* and the UE 115-*c*). In some examples, a UE 115 may transmit a request for the coordination message 220. The UEs 115 receiving a coordination message 220 may determine (e.g., based on a destination identifier, an indication included in or associated with the coordination message 220, etc.) the intended recipient of the coordination message 220 and may identify the status of the respective one or more resources (e.g., indicated in the coordination message 220) based on the intended recipient and the indicated respective preference statuses. As an example, a coordination message 220 may indicate that a set of resources is preferred. The UE 115-*a* may transmit (e.g., via respective sidelinks 210) the coordination message 220 to both of the UEs 115-*b* and 115-*c*, along with an indication that the intended recipient is the UE 115-*b*. The UEs 115-*b* and 115-*c* may receive the coordination message 220, determine the intended recipient, and assign statuses to the set of resources accordingly. That is, the UE 115-*b* may identify that the set of resources are preferred (i.e., have a status of preferred) because the UE 115-*b* is the intended recipient, while the UE 115-*c* may identify that the set of resources are non-preferred (e.g., because the UE 115-*c* is not the intended recipient). Alternatively, the coordination message 220 may indicate that the set of resources is preferred for the UE 115-*b* and non-preferred for the UE 115-*c*, and the UEs 115-*b* and 115-*c* may identify the respective statuses of the set of resources based on the indication.

In some implementations of the present disclosure, the UEs 115-*b* and 115-*c* may be configured to utilize a coordination message 220 only if the respective UE 115 is the intended recipient. For example, the UE 115-*c* may be dynamically configured or configured via an RRC message (such as a PC5-RRC message) to disregard the coordination message 220 upon determining that the UE 115-*b* is the intended recipient (i.e., that the UE 115-*c* is not the intended recipient). In some cases, such behavior may be preconfigured, for example, per resource pool, per carrier, or per frequency band. In some examples, the coordination message 220 or an associated SCI (e.g., SCI-2) may include an indication that the coordination message 220 is to be utilized only by the intended recipient.

In some examples, the UE 115-*a* may transmit dedicated coordination messages 220 to the UEs 115-*b* and 115-*c* for resources to be used in sidelink communications between the UEs 115. As illustrated in FIG. 2, the UE 115-*a* may transmit a coordination message 220-*a* to the UE 115-*b* via the sidelink 210-*a* and a coordination message 220-*b* to the UE 115-*c* via the sidelink 210-*b*. The coordination message 220-*a* may include coordination information for the UE 115-*b* and the coordination message 220-*b* may include coordination information for the UE 115-*c* (i.e., the content of the coordination message 220-*a* may be different from the coordination message 220-*b*). The UE 115-*a* may include, in the respective coordination messages 220, an explicit indication that the coordination message 220-*a* is for the UE 115-*b* and that the coordination message 220-*b* is for the UE 115-*c*.

Based on the coordination message 220-*a*, the UE 115-*b* may determine or otherwise identify a status (e.g., available, reserved, preferred, non-preferred) of one or more resources. For example, the UE 115-*b* may determine that the one or more resources are preferred based on the indication that the coordination message 220-*a* is for the UE 115-*b*. Additionally, or alternatively, the coordination message 220-*a* may include an indication that the one or more resources are preferred, non-preferred, or some combination thereof for the UE 115-*b*, such that the UE 115-*b* may identify the status based on the indication. The UE 115-*b* may select resources to use for transmitting, to the UE 115-*a* via the sidelink 210-*a*, a sidelink transmission 215-*a* based on the determined status.

The UE 115-*c* may likewise determine or otherwise identify a status of one or more resources based on the coordination message 220-*b*. If the coordination message 220-*b* includes an indication that the one or more resources are preferred or includes an indication that the UE 115-*c* is the intended recipient, the UE 115-*c* may determine that the one or more resources are preferred. If the coordination message 220-*b* includes an indication that the one or more resources are non-preferred or that another UE 115 is the intended recipient, the UE 115-*c* may determine that the one or more resources are non-preferred. The UE 115-*c* may use the determined status to select resources for transmitting, to the UE 115-*b* via the sidelink 210-*c*, the sidelink transmission 215-*b*.

In some examples, the UEs 115-*b* and 115-*c* may determine or otherwise identify the status of the one or more resources based on an implicit association between the coordination messages 220 and one or more of the resources. For instance, the UE 115-*b* may transmit a request for the coordination message 220-*a* on a first resource and may receive the coordination message 220-*a* on a second resource. The UE 115-*b* may determine that the UE 115-*b* is the intended recipient of the coordination message 220-*a* based on receiving the coordination message 220-*a* on the second resource. As another example, the UE 115-*b* may determine that the UE 115-*b* is an intended recipient by identifying that the coordination message 220-*a* is associated with a process to reserve the one or more resources. The UE 115-*b* may determine the status of the one or more resources based on identifying that the UE 115-*b* is the intended recipient of the coordination message 220-a. Additionally, or alternatively, the coordination message 220-a may be received on a resource that is associated with a resource indicated in the coordination message 220-a. For instance, the UE 115-b may receive the coordination message 220-a on a first resource, and the coordination message 220-a may indicate that a second resource is a preferred resource. The UE 115-b may identify the preferred resource based on identifying an association between the first resource and the second resource.

The UEs 115 may have one or more unicast connections with one another and may implement the techniques described herein to determine statuses for resources associated with the one or more unicast connections. For example, the UE 115-b may have a first unicast connection with the UE 115-a and a second unicast connection with the UE 115-c. The UE 115-b may receive, from the UE 115-a, the coordination message 220-a that indicates a preference status for resources associated with the first unicast connection. The UE 115-b may identify that the resources are preferred resources for the first unicast connection and may therefore further identify that the resources are non-preferred for the second unicast connection; thus, the UE 115-b may use the resources for transmitting to the UE 115-a on the first unicast connection and may refrain from using the resources for transmitting to the UE 115-c on the second unicast connection.

In some cases, the UE 115-b may have a third unicast connection that is also with the UE 115-a (e.g., in addition to the first unicast connection). In such cases, the coordination message 220-a may indicate (e.g., via a source identifier, a destination identifier, or both) that both the first unicast connection and the third unicast connection are to the same UE 115-a. The UE 115-b may determine that the resources preferred for the first unicast connection may also be preferred for the third unicast connection, and the UE 115-a may refrain from transmitting a coordination message 220 for each respective unicast connection. Alternatively, the UE 115-b may determine that the resources preferred for the unicast connection may be non-preferred for the third unicast connection, for instance, if the third unicast connection is associated with communications of a lower priority than the first unicast connection.

Figure 3:
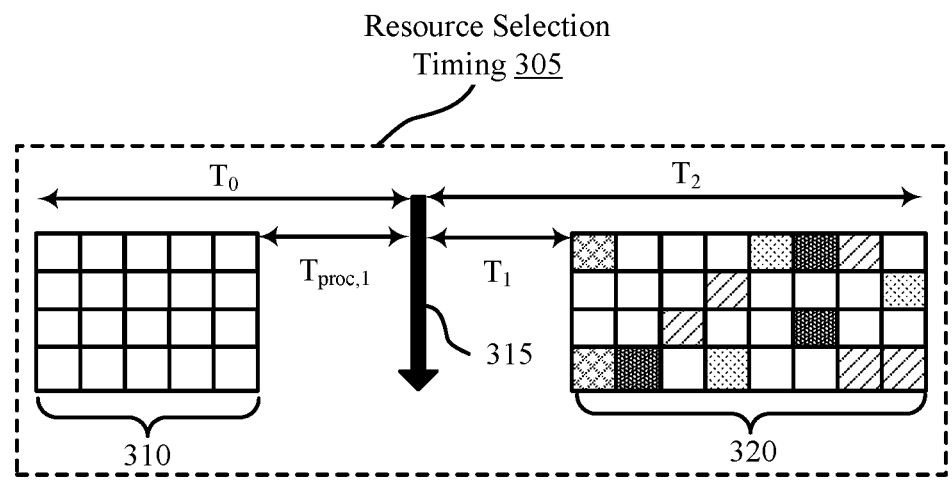
FIG. 3 illustrates an example of resource mapping that supports UE coordination for sidelink in accordance with aspects of the present disclosure.

FIG. 3 illustrates an example of a resource mapping 300 that supports UE coordination for sidelink in accordance with aspects of the present disclosure. In some examples, the resource mapping 300 may implemented by aspects of the wireless communications system 100 and the wireless communications system 200, as described in FIGS. 1 and 2. The resource mapping 300 may be implemented by a UE (e.g., a UE 115) to support coordination messages in a sidelink communications system according to the techniques described herein. For example, the resource mapping 300 may be used by a UE to determine and select resources to use for sidelink communications using coordination information received in a coordination message.

The resource mapping 300 may include a resource selection timing 305, which may include a sensing window 310, a resource selection trigger 315, and a resource selection window 320. The UE may monitor a control channel (e.g., a sidelink control channel) to receive and decode control signals during the sensing window 310. Upon receiving the resource selection trigger 315 (e.g., a data packet received $T_{proc,1}$ after the resource selection window 320 and $T_1$ before the resource selection window 320), the UE may select and reserve resources within the resource selection window 320 for sidelink communication with another UE, for instance, based on sensing performed during the sensing window 310 and coordination information received in a coordination message. The sensing window 310 may be configured to span a duration $T_0$ and the resource selection window may be configured to span a duration $T_2$.

During the sensing window 310, the UE may perform channel sensing (e.g., sidelink channel sensing) by decoding SCI to identify occupied or available sidelink resources, e.g., from a pool of sidelink resources. For example, the UE may receive SCI from multiple other UEs indicating sidelink resources reserved by the respective UE. Based on the channel sensing procedure, the UE may determine which resources are reserved (e.g., from resource reservations indicated in SCI) and which resources are available.

According to the techniques described herein, the UE may identify a status (e.g., available, preferred, non-preferred, conflicting, etc.) for each of the respective resources included in the resource selection window 320 based on the channel sensing procedure and one or more received coordination messages. For example, the UE may identify that a resource is a reserved resource 330, a preferred resource 335, a non-preferred resource 340, or a conflicting resource 345. The UE may determine a set of one or more candidate resources, which may include those identified as available during the sensing window 310 as well as those identified as preferred based on one or more received coordination messages, from which to select one or more resources 325 in one or more time slots of the resource selection window 320. The selected resources 325 may be used for sidelink communications by the UE.

As described with reference to FIG. 2, the UE may identify which of the resources are preferred resources 335, non-preferred resources 340, and conflicting resources 345, based on receiving one or more coordination messages that include coordination information. For example, the UE may receive a coordination message that indicates preferred resources 335, non-preferred resources 340, or some combination thereof, and the UE may identify the respective resources based on the indication(s). As an example, the coordination message may include a bitmap of the resource selection window 320, where each bit corresponds to a resource and indicates whether the resource is preferred or non-preferred. Additionally, or alternatively, the UE may receive a coordination message that is intended for a different UE, and the UE may identify the non-preferred resources 340 based on the UE not being the intended recipient of the coordination message.

In some examples, a coordination message may indicate that a resource conflict is detected for one or more resources, and the UE may identify the conflicting resources 345 based on the resource conflict indication. For example, a conflicting resource 345 may be a resource that is associated with resource reservations of two (or more) UEs. If a first UE transmits an indication of a resource reservation (e.g., as part of SCI) that is missed by a second UE, the second UE may be unaware of the resource reservation and may select or reserve the same resource. Thus, a UE identifying one or more conflicting resources 345 may refrain from selecting the conflicting resources 345 during the resource selection window, may remove or change a reservation associated with a conflicting resource 345, or, if the conflict has already occurred, may retransmit a message associated with a conflicting resource 345.

A given resource may be identified as having multiple statuses. For example, a reserved resource 330 may also be a non-preferred resource 340 and/or a conflicting resource 345. That is, the UE may determine that a resource is a reserved resource 330 based on the channel sensing procedure, and the same resource may be indicated as a non-preferred resource 340 in a coordination message (i.e., the resource is indicated as a non-preferred resource 340 because the resource is already reserved by another UE). Similarly, a selected resource 325 may also be a preferred resource 335; put another way, the UE may select a selected resource 325 based on the resource also being a preferred resource 335.

The UE may determine the set of candidate resources based on identifying the status of each resource. For example, the UE may exclude reserved resources 330, non-preferred resources 340, and conflicting resources 345 from the set of candidate resources such that the one or more selected resources 325 are selected from the remaining resources (e.g., of the resource selection window 320). In some examples, the UE may exclude reserved resources 330, non-preferred resources 340, and conflicting resources 345 in an order, for instance, based on when the sensing window 310 occurs and when the coordination message(s) are received. For instance, the UE may first exclude reserved resources 330 upon performing the channel sensing procedure during the sensing window 310, and may then exclude non-preferred resources 340 and conflicting resources 345 based on receiving a coordination message (e.g., after the sensing window 310). Additionally, or alternatively, the UE may include only preferred resources 335 in the set of candidate resources, such that the one or more selected resources 325 are selected from the preferred resources 335. The UE may select, from the set of candidate resources, one or more selected resources 325 in one or more slots of the resource selection window 320 to use for sidelink communications.

Figure 4:
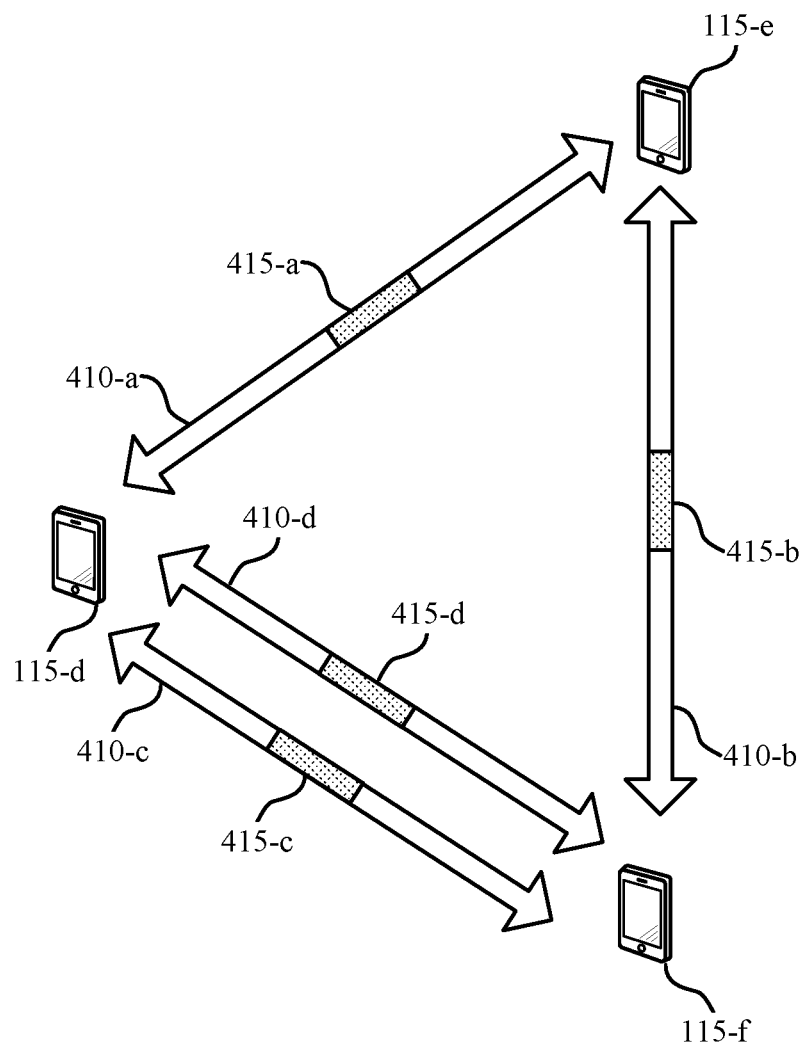
FIG. 4 illustrates an example of a wireless communications system that supports UE coordination for sidelink in accordance with aspects of the present disclosure.

FIG. 4 illustrates an example of a wireless communications system 400 that supports UE coordination for sidelink in accordance with aspects of the present disclosure. The wireless communications system 400 may implement aspects of the wireless communications systems 100 and 200. For example, the wireless communications system 400 may include a UE 115-d, a UE 115-e, and a UE 115-f, which may be examples of the corresponding devices described herein.

The UEs 115 may communicate with one another via sidelink communications over sidelink channels, which may support or be examples of unicast connections. For instance, the UE 115-d may have a unicast connection 410-a with the UE 115-e and the UE 115-e may have a unicast connection 410-b with the UE 115-f. The UE 115-d and the UE 115-f may have two unicast connections with one another, a unicast connection 410-c and a unicast connection 410-d.

As described herein and with reference to FIG. 2, the UEs 115 may transmit and receive coordination messages 415 over the corresponding unicast connections 410 and may identify a status of one or more communication resources for the sidelink communications based on receiving the coordination messages 415. In some examples, the UE 115-d may be designated (e.g., by a network) to generate and transmit coordination messages 415-a, 415-c, and 415-d to the corresponding UEs 115-e and 115-f, while in other examples, each of the UEs 115 may generate and transmit a coordination message 415. In some cases, the UE 115-e, the UE 115-f, or both may transmit, to the UE 115-d, a message requesting a coordination message 415, and the UE 115-d may transmit coordination messages 415 to the UEs 115-e and/or 115-f in response.

In the example of FIG. 4, the coordination messages 415 may include coordination information (e.g., a preference status) for communication resources associated with one or more of the unicast connections 410. In some cases, a coordination message 415 may include or may be associated with an indication of a source identifier associated with the transmitting UE 115, a destination identifier associated with the receiving UE 115, one or more of the associated unicast connections 410, or some combination thereof, that a UE 115 may use to identify the association between the communication resources and a unicast connection 410. For example, the coordination message 415-a transmitted from the UE 115-d to the UE 115-e may include an indication of a source identifier (e.g., associated with the UE 115-d), a destination identifier (e.g., associated with the UE 115-e), and/or an indication of the unicast connection 410-a. The coordination message 415-b, transmitted from the UE 115-e to the UE 115-f, may include an indication of a source identifier associated with the UE 115-e, a destination identifier associated with the UE 115-f, and an indication of the unicast connection 410-b. The coordination messages 415-c and 415-d may both include an indication of a source identifier associated with the UE 115-d and a destination identifier associated with the UE 115-f, but the coordination message 415-c may include an indication of the unicast connection 410-c, while the coordination message 415-d may include an indication of the unicast connection 410-d. In some cases, the coordination messages 415 may be associated with respective SCI-2 messages, and the SCI-2 messages may include an indication of the source identifier(s), destination identifier(s), unicast connection identifier(s), or some combination thereof. In such cases, a coordination message 415 may be implicitly associated with the indicated identifiers via the association with the respective SCI-2 message.

The unicast connection 410 associated with the resources indicated in the coordination messages 415 may be considered by a UE 115 when the UE 115 identifies the status of one or more resources. For example, the UE 115-e may receive the coordination message 415-a, which may indicate that one or more resources are preferred for the unicast connection 410-a. The UE 115-e may therefore identify that the one or more resources are non-preferred for the unicast connection 410-b. That is, because the UE 115-e has identified that the one or more resources are preferred for the unicast connection 410-a, the one or more resources may not be available for or may cause interference if used on the unicast connection 410-b, and may therefore be considered non-preferred for the unicast connection 410-b.

The UE 115-f may identify the status of one or more resources associated with the unicast connections 410-b, 410-c, and 410-d based on the received coordination messages 415-b, 415-c, and 415-d, respectively or in combination with one another. For example, the UE 115-f may determine (e.g., based on indications included in the coordination message 415-c and the coordination message 415-d, respectively) that the unicast connection 410-c and the unicast connection 410-d are both associated with the UE 115-d. The UE 115-f may be configured to determine that a coordination message 415 associated with one of the unicast connections 410-c or 410-d may be utilized for the other unicast connection 410-c or 410-d, for example, based on both of the unicast connections 410-c and 410-d being associated with the same UE 115-d (e.g., with the same source identifier). The coordination message 415-c may indicate that one or more resources are preferred resources for the unicast connection 410-c, and the UE 115-f may determine that the one or more resources are also preferred resources for the unicast connection 410-d.

Additionally, the UE **115-*f* may determine that the one or more resources identified and/or indicated as preferred for the unicast connections 410-*c* and 410-*d* are non-preferred for the unicast connection 410-*b*, for example, based on the unicast connection 410-*b* being between the UE 115-*f* and the UE 115-*e*. In some cases, the UE 115-*f* may determine preferred resources for the unicast connection 410-*b* based on a preference status included in the coordination message 415-*b*. The preferred resources for the unicast connection 410-*b* may further be identified by the UE 115-*f* as being non-preferred for the unicast connection 410-*c* and/or the unicast connection 410-*d***.

Alternatively, in some examples, the UE **115-*f* may determine that resources indicated or identified as preferred for one unicast connection 410 between the UE 115-*f* and the UE 115-*d* are non-preferred for the other unicast connection 410 between the UE 115-*f* and the UE 115-*d*. The UE 115-*f* may identify that one or more resources are preferred for the unicast connection 410-*c*, for example, based on an indication included in the coordination message 415-*c*. The one or more resources may be identified by the UE 115-*f* as being non-preferred for the unicast connection 410-*d*. Likewise, the coordination message 415-*d* may indicate that one or more resources are preferred for the unicast connection 410-*d*, and the UE 115-*f* may determine that the one or more resources are non-preferred for the unicast connection 410-*c***.

Each of the UEs **115-*d*, 115-*e*, and 115-*f* may select one or more resources (e.g., as described with reference to FIG. 3) for sidelink communications for corresponding unicast connections 410 based on identifying the status of one or more resources. For example, the UE 115-*f* may select resources, for a transmission to the UE 115-*d* using the unicast connection 410-*c*, that were identified as preferred for the unicast connection 410-*c* and may refrain from selecting resources that were indicated as non-preferred for the unicast connection 410-*c* or were indicated as preferred for another unicast connection 410**.

Figure 5:
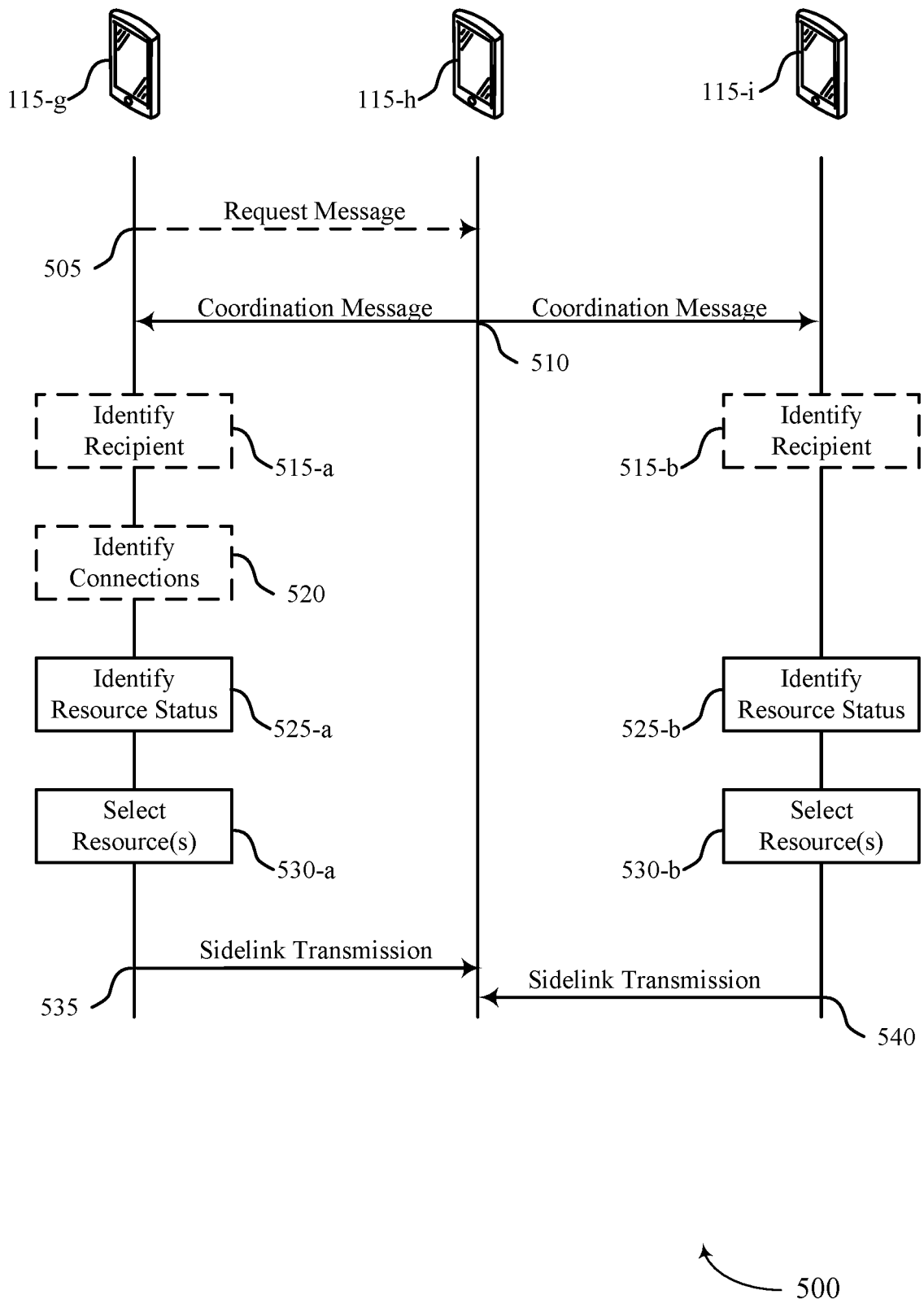
FIG. 5 illustrates an example of a process flow that supports UE coordination for sidelink in accordance with aspects of the present disclosure.

FIG. 5 illustrates an example of a process flow 500 that supports UE coordination for sidelink in accordance with aspects of the present disclosure. In some examples, the process flow 500 may implement aspects of wireless communications systems 100, 200, or 400. For example, process flow 500 may include a UE **115-*g*, UE 115-*h*, and UE 115-*i*, which may be examples of corresponding wireless devices as described herein. In the following description of the process flow 500, the operations between the UEs 115 may be transmitted in a different order than the exemplary order shown, or the operations performed by the UEs 115 may be performed in different orders or at different times. Some operations may also be left out of the process flow 500, or other operations may be added to the process flow 500. While the UEs 115 are shown performing operations of process flow 500**, any wireless device may perform the operations shown.

The UEs 115 illustrated in FIG. 5 may communicate with one another via one or more sidelink channels. For example, the UEs 115 use sensing and resource selection processes as described with reference to FIG. 3 and may transmit and receive sidelink communications. In some examples, the UEs 115 may communicate using one or more unicast connections with one or more other UEs 115. As described herein, the UEs 115 may utilize coordination messages to determine or otherwise identify a status of one or more communication resources, where the status may indicate whether a respective communication resource is preferred, non-preferred, available, or unavailable. The UEs 115 may select one or more communication resources for the sidelink communications based on the identified status(es).

At 505, the UE **115-*g* may transmit a request message to the UE 115-*h* to request a coordination message for the sidelink communications between the UEs 115**.

At 510, the UE **115-*h* may generate and transmit a coordination message to both of the UE 115-*g* and the UE 115-*i*. The coordination message may be included as part of an RRC message, a MAC-CE, an SCI-1, or an SCI-2. The coordination message may indicate a preference status of one or more communication resources for the sidelink communications. The preference status may indicate whether a respective communication resource is preferred or non-preferred. In some cases, the coordination message may indicate whether a resource conflict for the one or more communication resources is detected; the resource conflict may be indicated by a NACK associated with a message transmitted by a scheduling UE of the sidelink communications. In some examples, the UE 115-*h* may transmit the coordination message to the UE 115-*g* based on receiving the request message at 505**.

At **515-*a*, the UE 115-*g* may identify an intended recipient of the coordination message, i.e., the UE 115-*g* may identify whether the UE 115-*g* is an intended recipient of the coordination message. In some examples, the coordination message may include an indication of the intended recipient. In some cases, the UE 115-*g* may identify an intended recipient of the coordination message by identifying a destination identifier included in the coordination message. In some examples, the coordination message may be associated with the destination identifier, for example, if the destination identifier is included in SCI (e.g., SCI-2) associated with the coordination message. In some cases, the UE 115-*g* may identify whether the UE 115-*g*** is an intended recipient of the coordination message by determining that the coordination message is associated with a process to reserve the communication resources for the sidelink communications.

At **515-*b*, the UE 115-*i* may likewise identify whether the UE 115-*i*** is an intended recipient of the coordination message, for example, based on an indication of the intended recipient (e.g., a destination identifier) included in the coordination message or in SCI associated with the coordination message.

At 520, the UE **115-*g* may identify one or more communication connections associated with the communication resources. For example, the UE 115-*g* may determine that the communication resources are associated with a first unicast connection between the UE 115-*g* and the UE 115-*h*. In some examples, the coordination message received at 510 may include an indication of the first unicast connection, an indication of a second unicast connection, or both. In some cases, the coordination message may include an indication of a source identifier and a destination identifier, and the UE 115-*g*** may identify the first unicast connection, the second unicast connection, or both based on the source identifier and the destination identifier.

At **525-*a*, the UE 115-*g* may identify a status of one or more of the communication resources, for example, based on the coordination message received at 510. The identified status may indicate whether a respective communication resource is available, reserved, preferred, non-preferred, or some combination thereof. In some examples, the UE 115-*g*** may identify that one or more communication resources are preferred or non-preferred based on the respective preference status of the resource indicated in the coordination message.

Additionally, or alternatively, the UE 115-g may identify the status of one or more of the communication resources based on the intended recipient identified at 515-a. For example, the UE 115-g may identify the status of the one or more communication resources based on determining, at 515-a, that the UE 115-g is the intended recipient of the coordination message; alternatively, the UE 115-g may identify the status based on determining (e.g., at 515-a) that the UE 115-g is not the intended recipient of the coordination message. In some examples, the UE 115-g may identify that the one or more communication resources are preferred based on the UE 115-g being the intended recipient.

In some examples, the UE 115-g may identify the status of one or more of the communication resources based on a combination of identifying the intended recipient and identifying the preference status of the one or more communication resources indicated in the coordination message. For example, the coordination message may indicate that the one or more communication resources are preferred or non-preferred. If, at 515-a, the UE 115-g is identified as the intended recipient, the UE 115-g may, at 525-a, identify the status of the one or more communication resources as corresponding to the preference status indicated in the coordination message. That is, if the coordination message indicates that the one or more communication resources are preferred and the UE 115-g is the intended recipient, the UE 115-g may identify that the one or more communication resources are preferred resources; if the coordination message indicates that the one or more communication resources are non-preferred and the UE 115-g is the intended recipient, the UE 115-g may identify that the one or more communication resources are non-preferred.

However, if the UE 115-g is not the intended recipient, the UE 115-g may, at 525-a, identify the status of the one or more communication resources as being the opposite of the preference status indicated in the coordination message. For example, if the coordination message indicates that the one or more communication resources are preferred but the UE 115-g is not the intended recipient, the UE 115-g may determine that the one or more communication resources are non-preferred resources.

In some examples, the UE 115-g may identify the status of the one or more communication resources based on the one or more associated communication connections (e.g., identified at 520 and/or indicated in the coordination message). For example, the UE 115-g may identify that the one or more communication resources are associated with and preferred for the first unicast connection with the UE 115-h. Additionally, in some cases, the UE 115-g may identify a status of one or more other communication resources associated with a second unicast connection with the UE 115-h, where the one or more other communication resources associated with the second unicast connection correspond to the one or more communication resources associated with the first unicast connection. For example, if the one or more communication resources associated with the first unicast connection are identified (e.g., by the UE 115-g) as preferred, the one or more other communication resources associated with the second unicast connection may likewise be identified (e.g., by the UE 115-g) as preferred. Alternatively, if the one or more communication resources associated with the first unicast connection are identified as preferred, the one or more other resources associated with the second unicast connection may be identified as non-preferred.

In some examples, the UE 115-g may identify a status of one or more communication resources associated with a third unicast connection with a UE 115 different from the UE 115-h, where the one or more communication resources associated with the third unicast connection correspond to the one or more communication resources associated with the first unicast connection. The UE 115-g may identify that the one or more communication resources associated with the third unicast connection are non-preferred resources, for instance, based on identifying that the one or more communication resources associated with the first unicast connection are preferred resources.

At 525-b, the UE 115-i may likewise identify a status of one or more of the communication resources, for example, based on the coordination message received at 510. In some examples, the UE 115-g may identify that one or more communication resources are preferred or non-preferred based on the respective preference status of the resource indicated in the coordination message, the intended recipient identified at 515-b, or some combination thereof. In the example of FIG. 5, the UE 115-i may identify, at 515-b, that the UE 115-i is not the intended recipient of the coordination message. The UE 115-i may identify that the coordination message indicates that the one or more communication resources are preferred resources. The UE 115-i may therefore identify that the one or more communication resources are non-preferred for the UE 115-i.

At 530-a, the UE 115-g may select one or more communication resources of the one or more communication resources for the sidelink communications based on the status(es) identified at 525-a. For example, the UE 115-g may select a communication resource from the identified preferred resources to transmit a sidelink transmission. In some examples, the UE 115-g may refrain from selecting a communication resource from the identified non-preferred resources.

At 530-b, the UE 115-i may likewise select one or more communication resources of the one or more communication resources for the sidelink communications based on the status(es) identified at 525-b. For example, the UE 115-i may select a communication resource from the identified preferred resources to transmit a sidelink transmission and may refrain from selecting a communication resource from the identified non-preferred resources.

At 535, the UE 115-g may transmit a sidelink transmission to the UE 115-h using the resources selected at 530-a. Similarly, at 540, the UE 115-h may transmit a sidelink transmission to the UE 115-h using the resources selected at 530-b.

Figure 6:
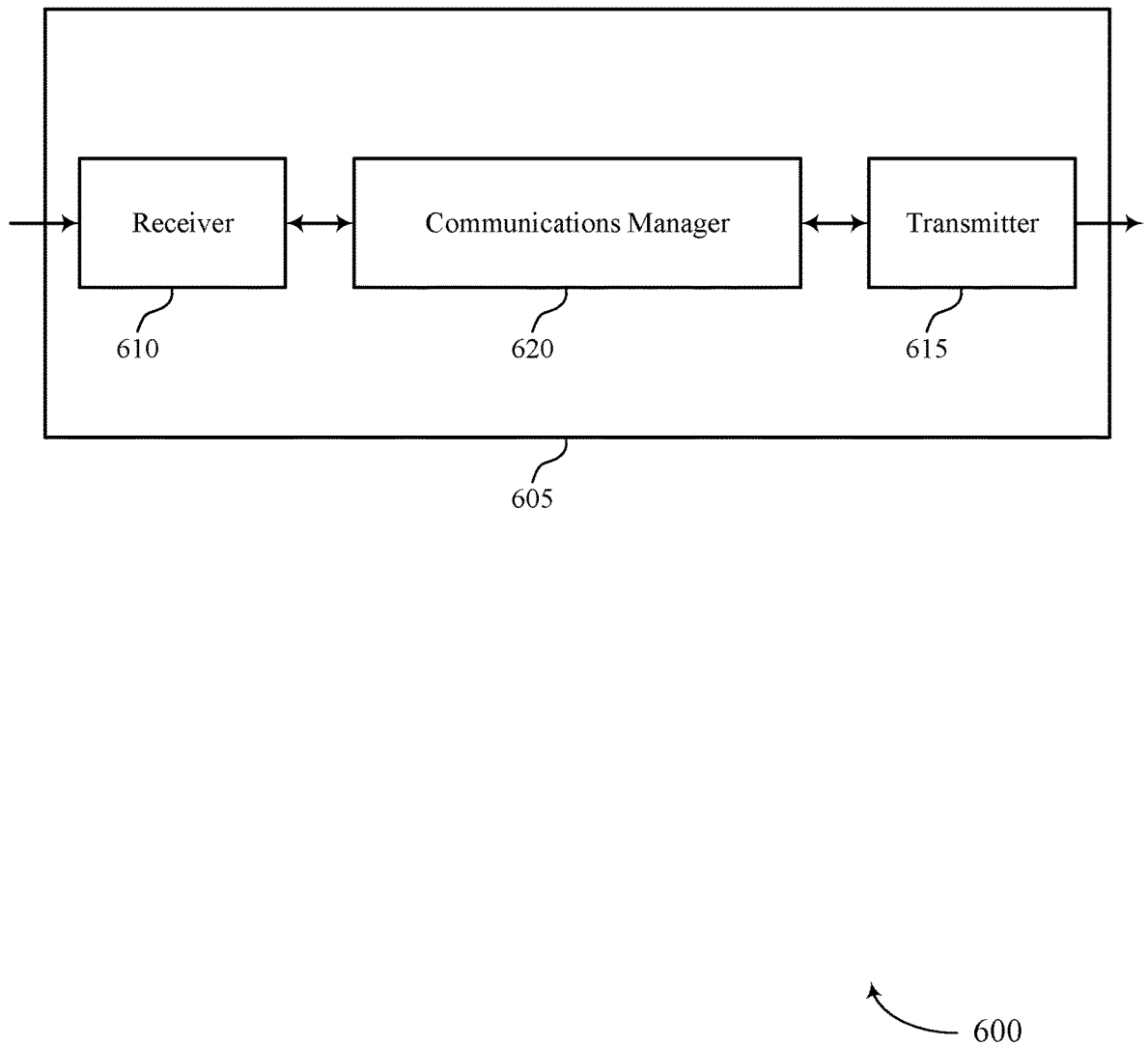
FIGS. 6 and 7 show block diagrams of devices that support UE coordination for sidelink in accordance with aspects of the present disclosure.

FIG. 6 shows a block diagram 600 of a device 605 that supports UE coordination for sidelink in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to UE coordination for sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to UE coordination for sidelink). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of UE coordination for sidelink as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for receiving, from a second UE, a coordination message over a sidelink channel that indicates a preference status of communication resources for sidelink communications between two or more UEs. The communications manager 620 may be configured as or otherwise support a means for identifying a status of one or more communication resources for the sidelink communications based on the received coordination message, where the identified status of each communication resource of the one or more communication resources indicates whether a respective communication resource is available, reserved, preferred, or non-preferred, or a combination thereof. The communications manager 620 may be configured as or otherwise support a means for selecting a communication resource for the sidelink communications based on the identified status of the one or more communication resources.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficiently utilizing sidelink resources in sidelink communications. Including an indication of a preference status of communication resources in a coordination message may enable the device 605 to avoid resources that may cause a conflict with another device, thereby avoiding latency and increasing communications reliability. Further, by determining a preference status based on whether the device 605 is an intended recipient of the coordination message, the device 605 may transmit and/or receive fewer overall coordination messages.

Figure 7:
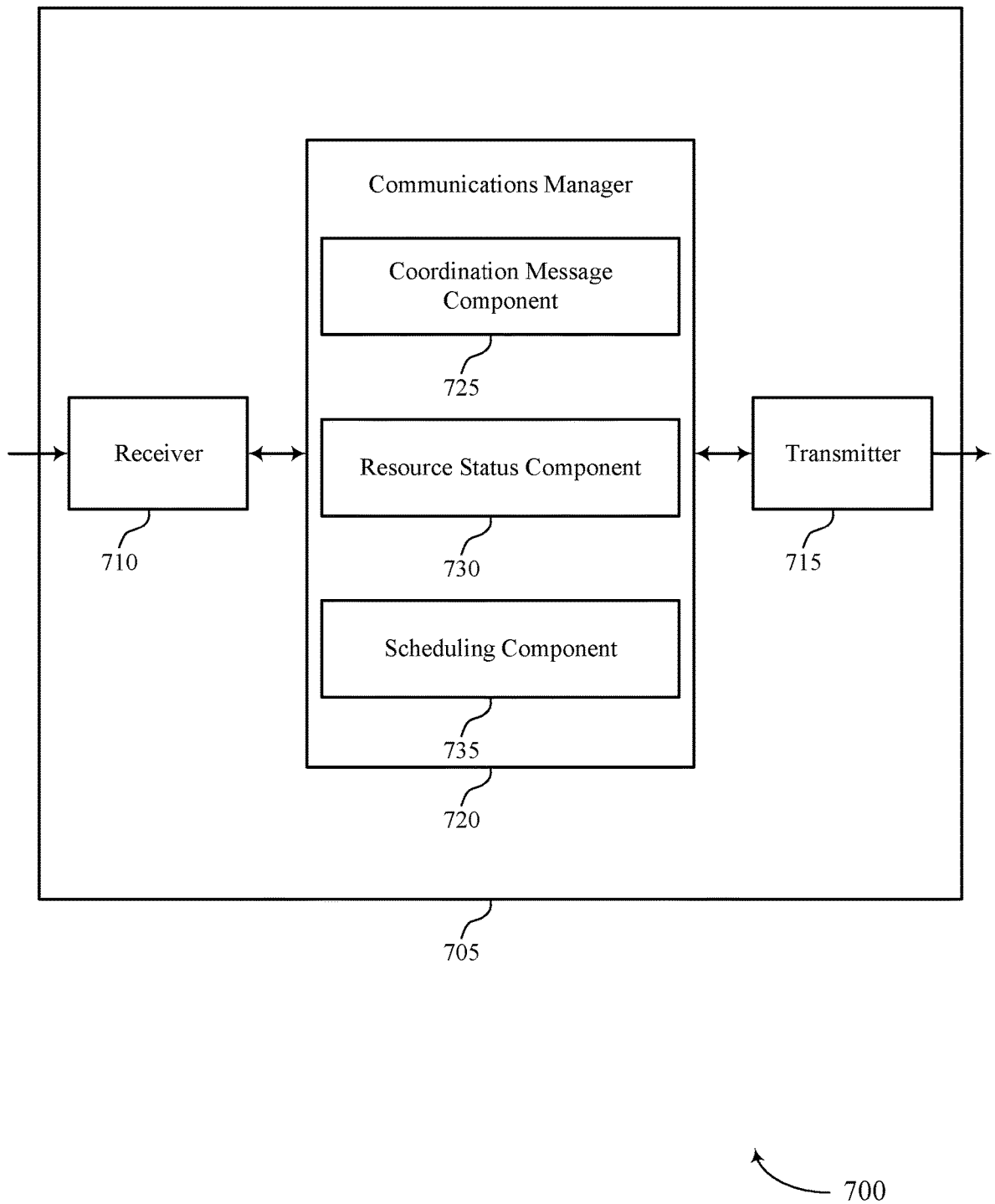

FIG. 7 shows a block diagram 700 of a device 705 that supports UE coordination for sidelink in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to UE coordination for sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to UE coordination for sidelink). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of UE coordination for sidelink as described herein. For example, the communications manager 720 may include a coordination message component 725, a resource status component 730, a scheduling component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The coordination message component 725 may be configured as or otherwise support a means for receiving, from a second UE, a coordination message over a sidelink channel that indicates a preference status of communication resources for sidelink communications between two or more UEs. The resource status component 730 may be configured as or otherwise support a means for identifying a status of one or more communication resources for the sidelink communications based on the received coordination message, where the identified status of each communication resource of the one or more communication resources indicates whether a respective communication resource is available, reserved, preferred, or non-preferred, or a combination thereof. The scheduling component 735 may be configured as or otherwise support a means for selecting a communication resource for the sidelink communications based on the identified status of the one or more communication resources.

Figure 8:
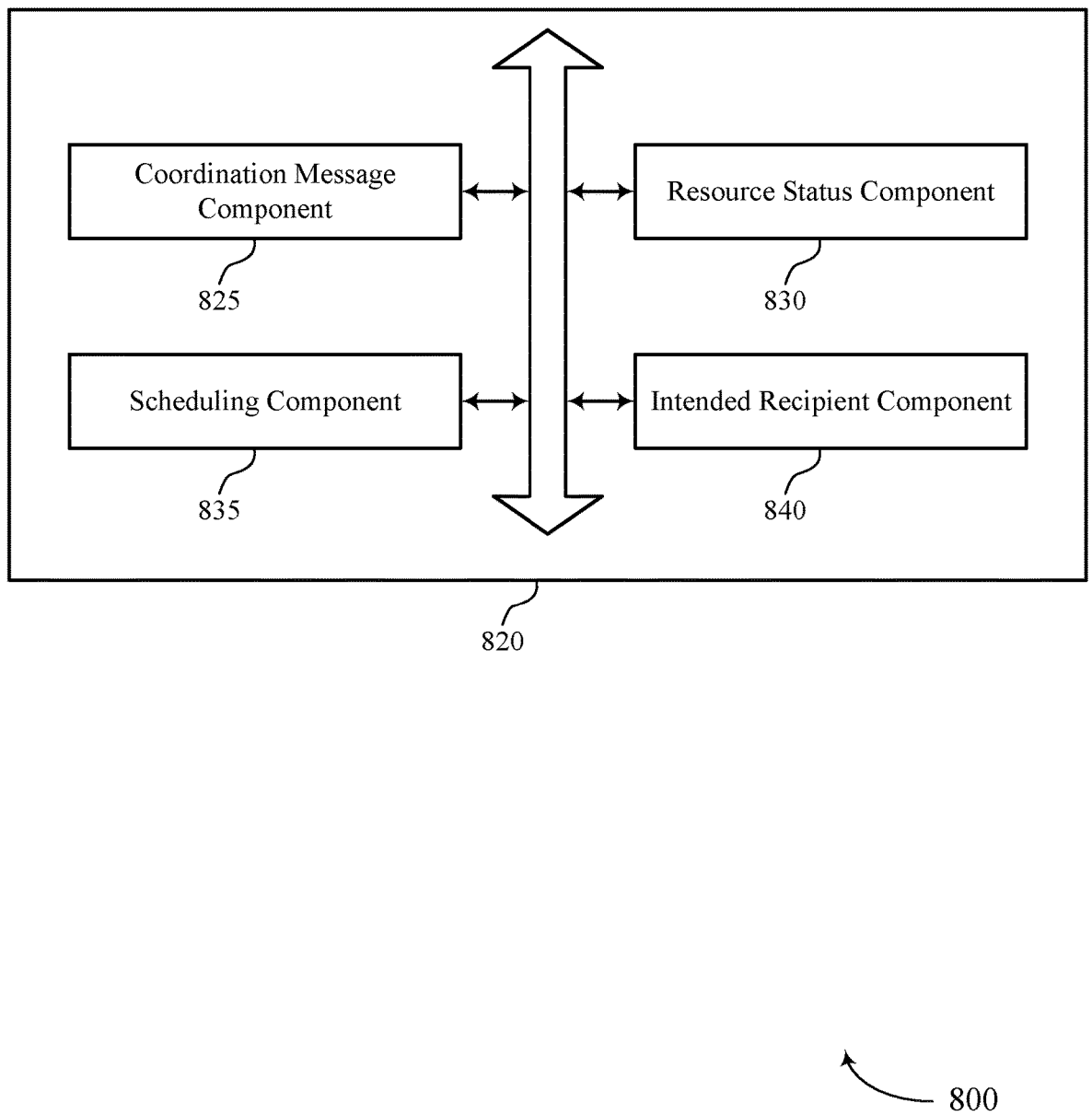
FIG. 8 shows a block diagram of a communications manager that supports UE coordination for sidelink in accordance with aspects of the present disclosure.

FIG. 8 shows a block diagram 800 of a communications manager 820 that supports UE coordination for sidelink in accordance with aspects of the present disclosure. The communications manager 820 may be an example of aspects of a communications manager 620, a communications manager 720, or both, as described herein. The communications manager 820, or various components thereof, may be an example of means for performing various aspects of UE coordination for sidelink as described herein. For example, the communications manager 820 may include a coordination message component 825, a resource status component 830, a scheduling component 835, an intended recipient component 840, or any combination thereof. Each of these components may communicate, directly or indirectly, with one another (e.g., via one or more buses).

The communications manager 820 may support wireless communications at a first UE in accordance with examples as disclosed herein. The coordination message component 825 may be configured as or otherwise support a means for receiving, from a second UE, a coordination message over a sidelink channel that indicates a preference status of communication resources for sidelink communications between two or more UEs. The resource status component 830 may be configured as or otherwise support a means for identifying a status of one or more communication resources for the sidelink communications based on the received coordination message, where the identified status of each communication resource of the one or more communication resources indicates whether a respective communication resource is available, reserved, preferred, or non-preferred, or a combination thereof. The scheduling component 835 may be configured as or otherwise support a means for selecting a communication resource for the sidelink communications based on the identified status of the one or more communication resources.

In some examples, to support identifying the status, the resource status component 830 may be configured as or otherwise support a means for identifying that the one or more communication resources are preferred for the sidelink communications between the two or more UEs or the one or more communication resources are non-preferred for the sidelink communications between the two or more UEs, where the preference status indicates whether the one or more communication resources are preferred or non-preferred for the sidelink communications between the two or more UEs.

In some examples, the scheduling component 835 may be configured as or otherwise support a means for transmitting a message requesting the coordination message for the sidelink communications, where receiving the coordination message is based on transmitting the message.

In some examples, the intended recipient component 840 may be configured as or otherwise support a means for identifying whether the first UE is an intended recipient of the coordination message, where identifying the status of the one or more communication resources is based on identifying whether the first UE is the intended recipient of the coordination message.

In some examples, the coordination message component 825 may be configured as or otherwise support a means for identifying whether the coordination message indicates preferred resources or non-preferred resources, where identifying the status of the one or more communication resources is based on identifying whether the first UE is the intended recipient of the coordination message and identifying whether the coordination message indicates the preferred resources or the non-preferred resources.

In some examples, to support identifying the status, the resource status component 830 may be configured as or otherwise support a means for identifying that the communication resource is a preferred resource based on the first UE being the intended recipient and the coordination message indicating the preferred resources. In some examples, to support identifying the status, the resource status component 830 may be configured as or otherwise support a means for identifying that the communication resource is a non-preferred resource based on a third UE being the intended recipient and the coordination message indicating the preferred resources. In some examples, to support identifying the status, the resource status component 830 may be configured as or otherwise support a means for identifying that the communication resource is a non-preferred resource based on the first UE being the intended recipient and the coordination message indicating the non-preferred resources.

In some examples, the coordination message includes an indication of the intended recipient. In some examples, the intended recipient component 840 may be configured as or otherwise support a means for identifying a destination identifier included in or associated with the coordination message, where identifying whether the first UE is the intended recipient of the coordination message is based on identifying the destination identifier.

In some examples, the destination identifier is included in sidelink control information associated with the coordination message.

In some examples, identifying whether the first UE is the intended recipient of the coordination message is based on the coordination message being associated with a process to reserve the communication resource for the sidelink communications.

In some examples, the coordination message includes a portion of an RRC message, a portion of a MAC-CE, a portion of a first-stage SCI, or a portion of a second-stage SCI.

In some examples, the one or more communication resources for the sidelink communications are associated with a first unicast communication connection between the first UE and the second UE. In some examples, to support identifying the status, the resource status component 830 may be configured as or otherwise support a means for identifying that the one or more communication resources are preferred resources of the first unicast communication connection based on receiving the coordination message.

In some examples, the resource status component 830 may be configured as or otherwise support a means for identifying that a second communication resource of a second unicast communication connection between the first UE and the second UE is a preferred resource based on receiving the coordination message for the first unicast communication connection, the second communication resource corresponding to one of the one or more communication resources of the first unicast communication connection.

In some examples, the resource status component 830 may be configured as or otherwise support a means for identifying that a second communication resource of a second unicast communication connection between the first UE and the second UE is a non-preferred resource based on receiving the coordination message for the first unicast communication connection that indicates that the one or more communication resources are the preferred resources, the second communication resource corresponding to one of the one or more communication resources of the first unicast communication connection.

In some examples, the resource status component 830 may be configured as or otherwise support a means for identifying that a second communication resource of a second unicast communication connection between the first UE and a third UE is a non-preferred resource based on receiving the coordination message for the first unicast communication connection that indicates that the one or more communication resources are the preferred resources, the second communication resource corresponding to one of the one or more communication resources of the first unicast communication connection.

In some examples, the coordination message indicates a source identifier and a destination identifier, and the coordination message component 825 may be configured as or otherwise support a means for identifying the first unicast communication connection based on the source identifier and the destination identifier.

In some examples, the coordination message includes a first indication of the first unicast communication connection and a second indication of a second unicast communication connection. In some examples, the coordination message indicates whether a resource conflict for the one or more communication resources for the sidelink communications is detected. In some examples, an indication of the resource conflict includes a NACK associated with a message transmitted by a scheduling UE of the sidelink communications.

Figure 9:
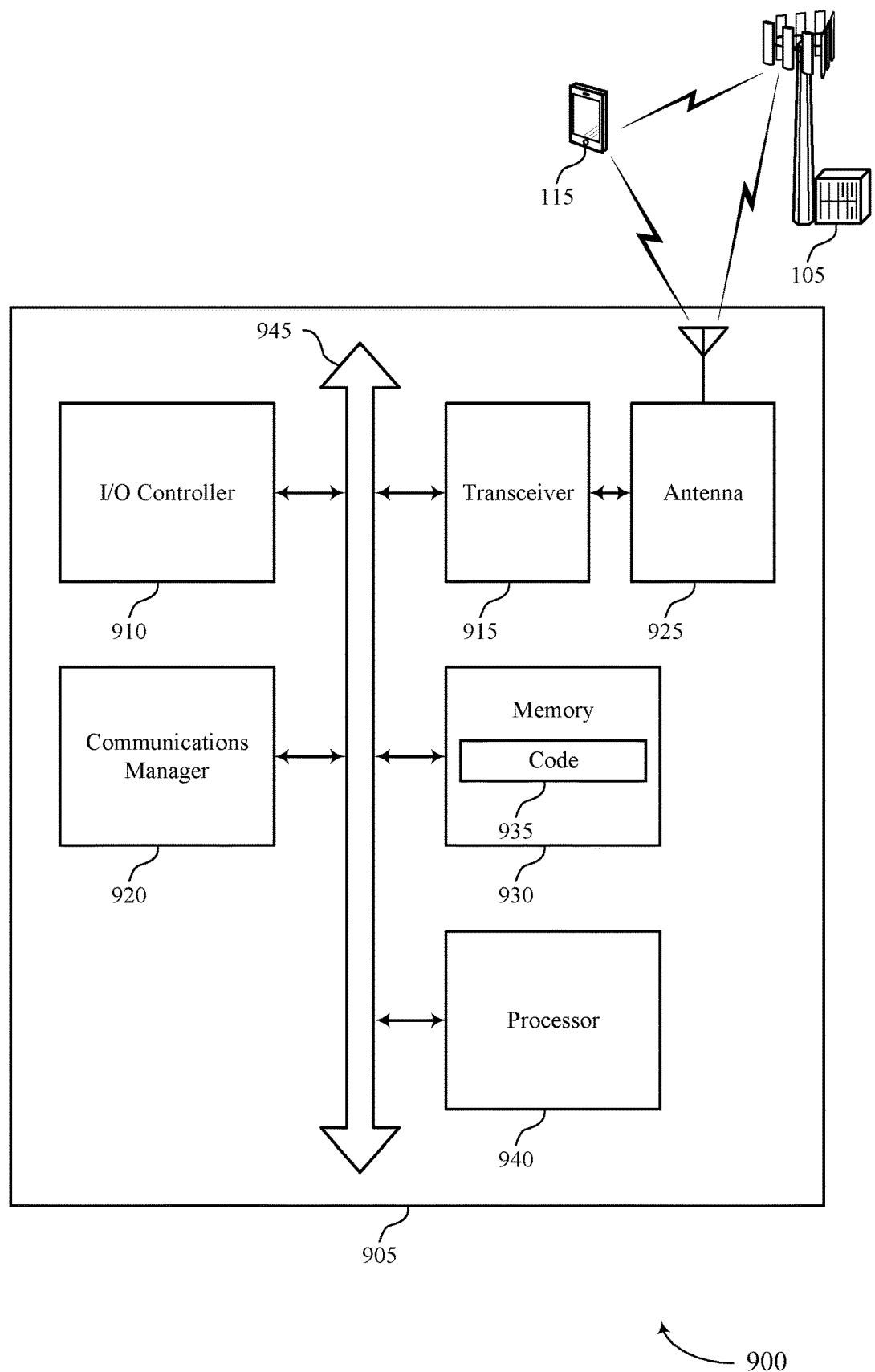
FIG. 9 shows a diagram of a system including a device that supports UE coordination for sidelink in accordance with aspects of the present disclosure.

FIG. 9 shows a diagram of a system 900 including a device 905 that supports UE coordination for sidelink in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting UE coordination for sidelink). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for receiving, from a second UE, a coordination message over a sidelink channel that indicates a preference status of communication resources for sidelink communications between two or more UEs. The communications manager 920 may be configured as or otherwise support a means for identifying a status of one or more communication resources for the sidelink communications based on the received coordination message, where the identified status of each communication resource of the one or more communication resources indicates whether a respective communication resource is available, reserved, preferred, or non-preferred, or a combination thereof. The communications manager 920 may be configured as or otherwise support a means for selecting a communication resource for the sidelink communications based on the identified status of the one or more communication resources.

By including or configuring the communications manager 920 in accordance with examples as described herein, the device 905 may support techniques for more efficiently utilizing sidelink resources in sidelink communications. Enabling the device 905 and other devices to receive a same coordination message and determine a preference status of communication resources may improve coordination among the devices (e.g., including the device 905), which may in turn reduce latency and increase communications reliability. Further, fewer coordination messages overall may be transmitted or received by the device 905, which may increase efficiency of the system.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of UE coordination for sidelink as described herein, or the processor 940 and the memory 930 may be otherwise configured to perform or support such operations.

Figure 10:
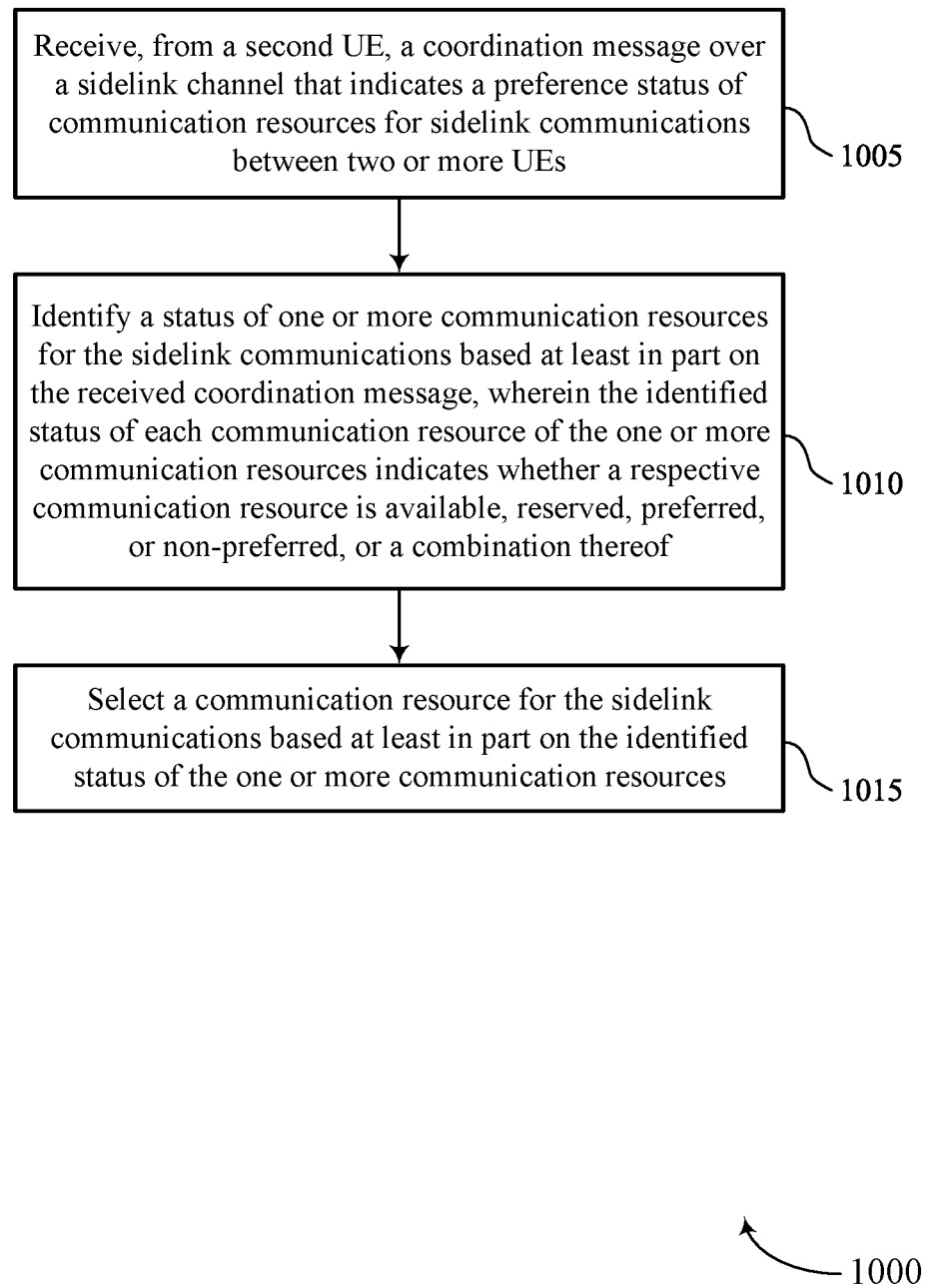
FIGS. 10 through 12 show flowcharts illustrating methods that support UE coordination for sidelink in accordance with aspects of the present disclosure.

FIG. 10 shows a flowchart illustrating a method 1000 that supports UE coordination for sidelink in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a second UE, a coordination message over a sidelink channel that indicates a preference status of communication resources for sidelink communications between two or more UEs. The operations of 1005 may be performed in accordance with examples as disclosed herein. In some examples, aspects of the operations of 1005 may be performed by a coordination message component 825 as described with reference to FIG. 8.

At 1010, the method may include identifying a status of one or more communication resources for the sidelink communications based on the received coordination message, where the identified status of each communication resource of the one or more communication resources indicates whether a respective communication resource is available, reserved, preferred, or non-preferred, or a combination thereof. The operations of 1010 may be performed in accordance with examples as disclosed herein. In some examples, aspects of the operations of 1010 may be performed by a resource status component 830 as described with reference to FIG. 8.

At 1015, the method may include selecting a communication resource for the sidelink communications based on the identified status of the one or more communication resources. The operations of 1015 may be performed in accordance with examples as disclosed herein. In some examples, aspects of the operations of 1015 may be performed by a scheduling component 835 as described with reference to FIG. 8.

Figure 11:
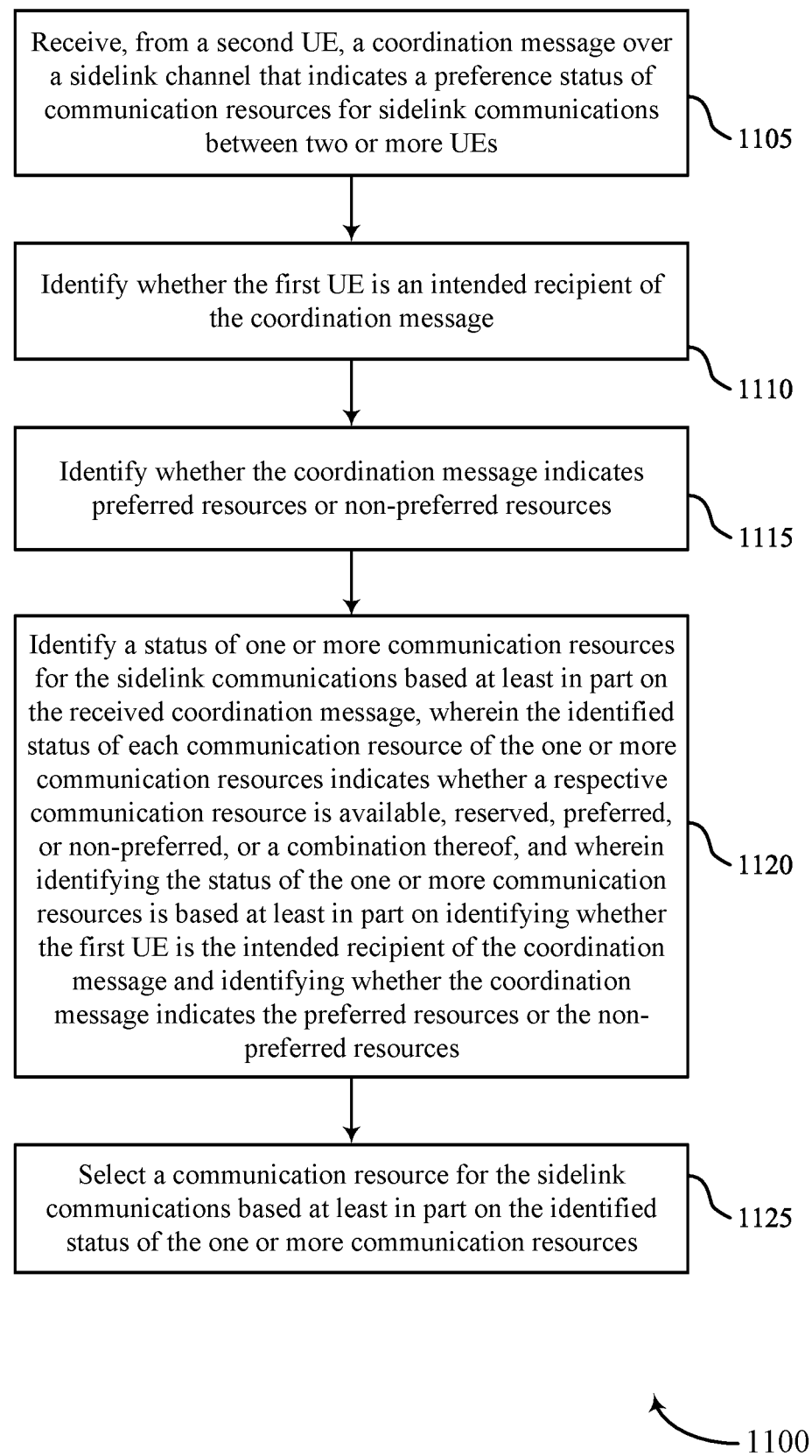

FIG. 11 shows a flowchart illustrating a method 1100 that supports UE coordination for sidelink in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a second UE, a coordination message over a sidelink channel that indicates a preference status of communication resources for sidelink communications between two or more UEs. The operations of 1105 may be performed in accordance with examples as disclosed herein. In some examples, aspects of the operations of 1105 may be performed by a coordination message component 825 as described with reference to FIG. 8.

At 1110, the method may include identifying whether the first UE is an intended recipient of the coordination message. The operations of 1110 may be performed in accordance with examples as disclosed herein. In some examples, aspects of the operations of 1110 may be performed by an intended recipient component 840 as described with reference to FIG. 8.

At 1115, the method may include identifying whether the coordination message indicates preferred resources or non-preferred resources, The operations of 1115 may be performed in accordance with examples as disclosed herein. In some examples, aspects of the operations of 1115 may be performed by a coordination message component 825 as described with reference to FIG. 8.

At 1120, the method may include identifying a status of one or more communication resources for the sidelink communications based on the received coordination message, where the identified status of each communication resource of the one or more communication resources indicates whether a respective communication resource is available, reserved, preferred, or non-preferred, or a combination thereof, and where identifying the status of the one or more communication resources is based on identifying whether the first UE is the intended recipient of the coordination message and identifying whether the coordination message indicates the preferred resources or the non-preferred resources. The operations of 1120 may be performed in accordance with examples as disclosed herein. In some examples, aspects of the operations of 1120 may be performed by a resource status component 830 as described with reference to FIG. 8.

At 1125, the method may include selecting a communication resource for the sidelink communications based on the identified status of the one or more communication resources. The operations of 1125 may be performed in accordance with examples as disclosed herein. In some examples, aspects of the operations of 1125 may be performed by a scheduling component 835 as described with reference to FIG. 8.

Figure 12:
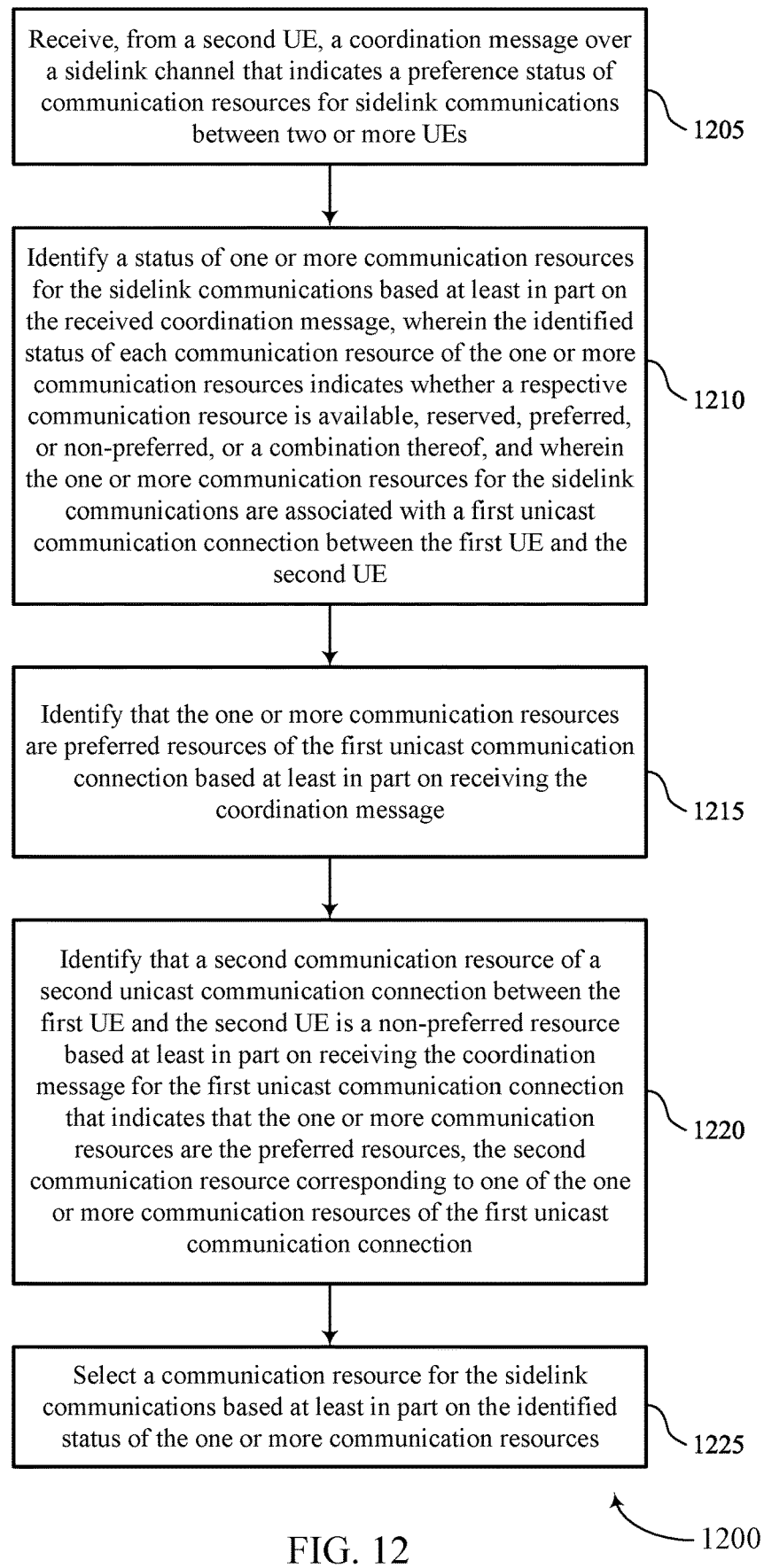

FIG. 12 shows a flowchart illustrating a method 1200 that supports UE coordination for sidelink in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a second UE, a coordination message over a sidelink channel that indicates a preference status of communication resources for sidelink communications between two or more UEs. The operations of 1205 may be performed in accordance with examples as disclosed herein. In some examples, aspects of the operations of 1205 may be performed by a coordination message component 825 as described with reference to FIG. 8.

At 1210, the method may include identifying a status of one or more communication resources for the sidelink communications based on the received coordination message, where the identified status of each communication resource of the one or more communication resources indicates whether a respective communication resource is available, reserved, preferred, or non-preferred, or a combination thereof, and where the one or more communication resources for the sidelink communications are associated with a first unicast communication connection between the first UE and the second UE. The operations of 1210 may be performed in accordance with examples as disclosed herein. In some examples, aspects of the operations of 1210 may be performed by a resource status component 830 as described with reference to FIG. 8.

At 1215, the method may include identifying that the one or more communication resources are preferred resources of the first unicast communication connection based on receiving the coordination message. The operations of 1215 may be performed in accordance with examples as disclosed herein. In some examples, aspects of the operations of 1215 may be performed by a resource status component 830 as described with reference to FIG. 8.

At 1220, the method may include identifying that a second communication resource of a second unicast communication connection between the first UE and the second UE is a non-preferred resource based on receiving the coordination message for the first unicast communication connection that indicates that the one or more communication resources are the preferred resources, the second communication resource corresponding to one of the one or more communication resources of the first unicast communication connection. The operations of 1220 may be performed in accordance with examples as disclosed herein. In some examples, aspects of the operations of 1220 may be performed by a resource status component 830 as described with reference to FIG. 8.

At 1225, the method may include selecting a communication resource for the sidelink communications based on the identified status of the one or more communication resources. The operations of 1225 may be performed in accordance with examples as disclosed herein. In some examples, aspects of the operations of 1225 may be performed by a scheduling component 835 as described with reference to FIG. 8.

The following provides an overview of aspects of the present disclosure:

Aspect 1: A method for wireless communications at a first UE, comprising: receiving, from a second UE, a coordination message over a sidelink channel that indicates a preference status of communication resources for sidelink communications between two or more UEs; identifying a status of one or more communication resources for the sidelink communications based at least in part on the received coordination message, wherein the identified status of each communication resource of the one or more communication resources indicates whether a respective communication resource is available, reserved, preferred, or non-preferred, or a combination thereof; and selecting a communication resource for the sidelink communications based at least in part on the identified status of the one or more communication resources.

Aspect 2: The method of aspect 1, wherein identifying the status further comprises: identifying that the one or more communication resources are preferred for the sidelink communications between the two or more UEs or the one or more communication resources are non-preferred for the sidelink communications between the two or more UEs, wherein the preference status indicates whether the one or more communication resources are preferred or non-preferred for the sidelink communications between the two or more UEs.

Aspect 3: The method of any of aspects 1 through 2, further comprising: transmitting a message requesting the coordination message for the sidelink communications, wherein receiving the coordination message is based at least in part on transmitting the message.

Aspect 4: The method of any of aspects 1 through 3, further comprising: identifying whether the first UE is an intended recipient of the coordination message, wherein identifying the status of the one or more communication resources is based at least in part on identifying whether the first UE is the intended recipient of the coordination message.

Aspect 5: The method of aspect 4, further comprising: identifying whether the coordination message indicates preferred resources or non-preferred resources, wherein identifying the status of the one or more communication resources is based at least in part on identifying whether the first UE is the intended recipient of the coordination message and identifying whether the coordination message indicates the preferred resources or the non-preferred resources.

Aspect 6: The method of aspect 5, wherein identifying the status further comprises: identifying that the communication resource is a preferred resource based at least in part on the first UE being the intended recipient and the coordination message indicating the preferred resources.

Aspect 7: The method of any of aspects 5 through 6, wherein identifying the status further comprises: identifying that the communication resource is a non-preferred resource based at least in part on a third UE being the intended recipient and the coordination message indicating the preferred resources.

Aspect 8: The method of any of aspects 5 through 7, wherein identifying the status further comprises: identifying that the communication resource is a non-preferred resource based at least in part on the first UE being the intended recipient and the coordination message indicating the non-preferred resources.

Aspect 9: The method of any of aspects 4 through 8, wherein the coordination message includes or is associated with an indication of the intended recipient.

Aspect 10: The method of any of aspects 4 through 9, further comprising: identifying a destination identifier included in or associated with the coordination message, wherein identifying whether the first UE is the intended recipient of the coordination message is based at least in part on identifying the destination identifier.

Aspect 11: The method of aspect 10, wherein the destination identifier is included in sidelink control information associated with the coordination message.

Aspect 12: The method of any of aspects 4 through 11, wherein identifying whether the first UE is the intended recipient of the coordination message is based at least in part on the coordination message being associated with a process to reserve the communication resource for the sidelink communications.

Aspect 13: The method of any of aspects 1 through 12, wherein the coordination message comprises a portion of an RRC message, a portion of a MAC-CE, a portion of a first-stage SCI, or a portion of a second-stage SCI.

Aspect 14: The method of any of aspects 1 through 13, further comprising: the one or more communication resources for the sidelink communications are associated with a first unicast communication connection between the first UE and the second UE; and identifying the status further comprises identifying that the one or more communication resources are preferred resources of the first unicast communication connection based at least in part on receiving the coordination message.

Aspect 15: The method of aspect 14, further comprising: identifying that a second communication resource of a second unicast communication connection between the first UE and the second UE is a preferred resource based at least in part on receiving the coordination message for the first unicast communication connection, the second communication resource corresponding to one of the one or more communication resources of the first unicast communication connection.

Aspect 16: The method of any of aspects 14 through 15, further comprising: identifying that a second communication resource of a second unicast communication connection between the first UE and the second UE is a non-preferred resource based at least in part on receiving the coordination message for the first unicast communication connection that indicates that the one or more communication resources are the preferred resources, the second communication resource corresponding to one of the one or more communication resources of the first unicast communication connection.

Aspect 17: The method of any of aspects 14 through 16, further comprising: identifying that a second communication resource of a second unicast communication connection between the first UE and a third UE is a non-preferred resource based at least in part on receiving the coordination message for the first unicast communication connection that indicates that the one or more communication resources are the preferred resources, the second communication resource corresponding to one of the one or more communication resources of the first unicast communication connection.

Aspect 18: The method of any of aspects 14 through 17, wherein the coordination message indicates a source identifier and a destination identifier, the method further comprising: identifying the first unicast communication connection based at least in part on the source identifier and the destination identifier.

Aspect 19: The method of any of aspects 14 through 18, wherein the coordination message includes a first indication of the first unicast communication connection and a second indication of a second unicast communication connection.

Aspect 20: The method of any of aspects 1 through 19, wherein the coordination message indicates whether a resource conflict for the one or more communication resources for the sidelink communications is detected.

Aspect 21: The method of aspect 20, wherein an indication of the resource conflict comprises a NACK associated with a message transmitted by a scheduling UE of the sidelink communications.

Aspect 22: An apparatus for wireless communications at a first UE, comprising a processor; memory coupled with the processor; and instructions stored in the memory and executable by the processor to cause the apparatus to perform a method of any of aspects 1 through 21.

Aspect 23: An apparatus for wireless communications at a first UE, comprising at least one means for performing a method of any of aspects 1 through 21.

Aspect 24: A non-transitory computer-readable medium storing code for wireless communications at a first UE, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:
    one or more memories storing processor-executable code; and
    one or more processors coupled with the one or more memories and individually or collectively operable to execute the code to cause the first UE to:
        identify a status of one or more communication resources for sidelink communications between two or more UEs, wherein the identified status of each communication resource of the one or more communication resources indicates whether a respective communication resource is preferred or non-preferred; and
        transmit, to a second UE and based at least in part on the identified status, a coordination message over a sidelink channel that indicates coordination information associated with the one or more communication resources for the sidelink communications.

2. The first UE of claim 1, wherein, to identify the status, the one or more processors are individually or collectively further operable to execute the code to cause the first UE to:
    identify that the one or more communication resources are preferred for the sidelink communications between the two or more UEs or the one or more communication resources are non-preferred for the sidelink communications between the two or more UEs, wherein the coordination information comprises a preference status indicating whether the one or more communication resources are preferred or non-preferred for the sidelink communications between the two or more UEs.

3. The first UE of claim 1, wherein the one or more processors are individually or collectively further operable to execute the code to cause the first UE to:
receive a message requesting the coordination message for the sidelink communications, wherein transmitting the coordination message is based at least in part on receiving the message.

4. The first UE of claim 1, wherein the coordination message indicates that the one or more communication resources are preferred for transmissions of the second UE via the sidelink channel.

5. The first UE of claim 1, wherein the coordination message indicates that the one or more communication resources are non-preferred for transmissions of the second UE via the sidelink channel.

6. The first UE of claim 1, wherein:
the coordination information includes a bitmap comprising a set of bits, each bit of the set of bits corresponding to a respective communication resource of the one or more communication resources, and
a value of each bit of the set of bits indicates a preference status for the respective communication resource of the one or more communication resources.

7. The first UE of claim 1, wherein the coordination message includes an indication of a source identifier associated with the first UE.

8. The first UE of claim 7, wherein the source identifier is included in sidelink control information associated with the coordination message.

9. The first UE of claim 1, wherein the coordination message includes an indication of an intended recipient of the coordination message.

10. The first UE of claim 9, wherein the indication of the intended recipient comprises a destination identifier associated with the second UE.

11. The first UE of claim 10, wherein the destination identifier is included in sidelink control information associated with the coordination message.

12. The first UE of claim 1, wherein:
the coordination message reserves at least one communication resource of the one or more communication resources for the sidelink communications.

13. The first UE of claim 1, wherein the coordination message comprises a portion of a medium access control (MAC) control element (CE) and a portion of a second-stage SCI.

14. A method for wireless communications at a first user equipment (UE), comprising:
identifying a status of one or more communication resources for sidelink communications between two or more UEs, wherein the identified status of each communication resource of the one or more communication resources indicates whether a respective communication resource is preferred or non-preferred; and
transmitting, to a second UE and based at least in part on the identified status, a coordination message over a sidelink channel that indicates coordination information associated with the one or more communication resources for the sidelink communications.

15. The method of claim 14, wherein identifying the status further comprises:
identifying that the one or more communication resources are preferred for the sidelink communications between the two or more UEs or the one or more communication resources are non-preferred for the sidelink communications between the two or more UEs, wherein the coordination information comprises a preference status indicating whether the one or more communication resources are preferred or non-preferred for the sidelink communications between the two or more UEs.

16. The method of claim 14, further comprising:
receiving a message requesting the coordination message for the sidelink communications, wherein transmitting the coordination message is based at least in part on receiving the message.

17. The method of claim 14, wherein the coordination message indicates that the one or more communication resources are preferred for transmissions of the second UE via the sidelink channel.

18. The method of claim 14, wherein the coordination message indicates that the one or more communication resources are non-preferred for transmissions of the second UE via the sidelink channel.

19. The method of claim 14, wherein:
the coordination information includes a bitmap comprising a set of bits, each bit of the set of bits corresponding to a respective communication resource of the one or more communication resources, and
a value of each bit of the set of bits indicates a preference status for the respective communication resource of the one or more communication resources.

20. A non-transitory computer-readable medium storing code for wireless communications, the code comprising instructions executable by one or more processors to:
identify a status of one or more communication resources for sidelink communications between two or more UEs, wherein the identified status of each communication resource of the one or more communication resources indicates whether a respective communication resource is preferred or non-preferred; and
transmit, to a second UE and based at least in part on the identified status, a coordination message over a sidelink channel that indicates coordination information associated with the one or more communication resources for the sidelink communications.

* * * * *